US00RE37186E

(19) United States
(12) Reissued Patent
Hill

(10) Patent Number: US RE37,186 E
(45) Date of Reissued Patent: May 22, 2001

(54) UNIDIRECTIONAL PANEL

(75) Inventor: George Roland Hill, Stockport (GB)

(73) Assignee: Contra Vision Limited, Cheshire (GB)

(21) Appl. No.: 08/775,560

(22) Filed: Dec. 31, 1996

Related U.S. Patent Documents

Reissue of:
(64) Patent No.: 4,673,609
Issued: Jun. 16, 1987
Appl. No.: 06/760,048
Filed: Jul. 29, 1985

(30) Foreign Application Priority Data

Jul. 28, 1984 (GB) ..... 8419312
Feb. 19, 1985 (GB) ..... 8504187

(51) Int. Cl.[7] ..... B05D 1/12; E04B 1/00; E06B 7/12; G02B 17/00

(52) U.S. Cl. ..... 428/187; 428/191; 428/204; 428/208; 428/105; 428/171; 428/261; 428/132; 428/133; 428/134; 428/135; 428/136; 428/137; 428/138; 156/277; 156/240; 156/272.2; 156/273.3; 40/590; 40/591; 40/592; 40/584; 40/615; 40/427

(58) Field of Search ..... 428/187, 191, 428/204, 208, 132–138, 914; 156/277, 240, 272.2, 273.3; 40/590, 591, 592, 584, 615, 427

(56) References Cited

U.S. PATENT DOCUMENTS

| | | | |
|---|---|---|---|
| 728,063 | | 12/1903 | Wilson . |
| 760,059 | | 5/1904 | Dolley . |
| 809,698 | | 1/1906 | Kelley . |
| 1,199,882 | * | 10/1916 | Frey . |
| 1,842,324 | | 1/1932 | Griffith . |
| 1,938,085 | * | 12/1933 | Page . |

FOREIGN PATENT DOCUMENTS

| | | |
|---|---|---|
| 556 249 | 11/1974 | (CH) . |
| 0 000 446 A1 | 1/1979 | (EP) . |
| 82 06722 | 4/1982 | (FR) . |
| 1299910 | 12/1972 | (GB) . |
| 1 528 774 | 10/1978 | (GB) . |
| 1 567 625 | 5/1980 | (GB) . |
| 2 032 417 | 5/1980 | (GB) . |
| 2 045 326 | 10/1980 | (GB) . |
| 1 600 061 | 10/1981 | (GB) . |
| 2 088 613 | 6/1982 | (GB) . |
| 2 095 738 | 10/1982 | (GB) . |
| 54-93255 | 12/1952 | (JP) . |
| 51-14057 | 5/1976 | (JP) . |
| 51-86049 | 7/1976 | (JP) . |
| 53-33723 | 3/1978 | (JP) . |
| 54-8120 0 U | 4/1979 | (JP) . |
| 56-150702 | 11/1981 | (JP) . |

OTHER PUBLICATIONS

American Scenics Catalog (Oct. 4, 1978).
Shadow Screens 1979 Catalog and attached "Sample Material #1".
3M Aircraft Marking Films Brochure and attached sample "Aircraft Marking Film" (circa 1970).
GILA Automotive Products Catalog and attached "Sample Material #2".
"Green On Black" assembly (circa 1979).

*Primary Examiner*—Richard Weisberger
(74) *Attorney, Agent, or Firm*—Pillsbury Madison & Sutro LLP

(57) ABSTRACT

A panel which comprises a substrate of transparent or translucent material having applied to one or both sides a design superimposed on, or forming part of, an opaque pattern so that the design on one side of the panel cannot be seen from the other side.

This is a Reissue of a Patent which was the subject of a Reexamination Certificate No. B1 4,673,609, dated Jul. 25, 1995, Request No. 90/003,201, Sep. 21, 1993.

(List continued on next page.)

89 Claims, 20 Drawing Sheets

U.S. PATENT DOCUMENTS

| | | | |
|---|---|---|---|
| 2,009,167 | * | 7/1935 | Delano . |
| 2,071,921 | | 2/1937 | Dickson . |
| 2,107,141 | * | 2/1938 | Colt . |
| 2,115,409 | | 4/1938 | Casto . |
| 2,327,918 | * | 8/1943 | Miller . |
| 2,974,057 | | 7/1961 | Adams . |
| 3,085,474 | * | 4/1963 | Bourgeaux . |
| 3,305,623 | | 2/1967 | Bakker et al. . |
| 3,560,093 | * | 2/1971 | Montone . |
| 3,652,370 | * | 3/1972 | Motai . |
| 3,694,945 | * | 10/1972 | Detiker . |
| 3,725,184 | | 4/1973 | Scopp . |
| 3,745,678 | | 7/1973 | Thomassen . |
| 3,853,675 | | 12/1974 | Edwards . |
| 3,953,625 | * | 4/1976 | Quaintance et al. . |
| 3,961,434 | * | 6/1976 | Sampon . |
| 4,006,565 | | 2/1977 | Thompson et al. . |
| 4,056,648 | | 11/1977 | Richardson . |
| 4,102,101 | * | 7/1978 | Nielson et al. . |
| 4,167,839 | * | 9/1979 | Nielson et al. . |
| 4,235,048 | | 11/1980 | Gillery . |
| 4,261,649 | | 4/1981 | Richard . |
| 4,321,778 | * | 3/1982 | Whitehead . |
| 4,358,488 | | 11/1982 | Dunklin et al. . |
| 4,447,995 | * | 5/1984 | Fulcher . |

* cited by examiner

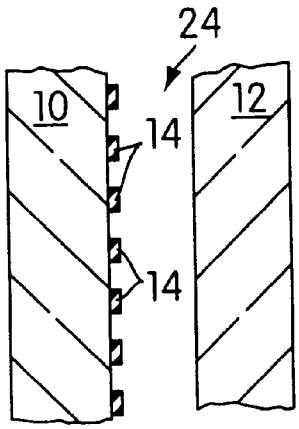
FIG.11
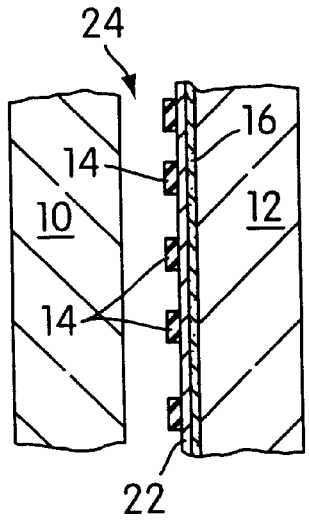
FIG.12
FIG.13
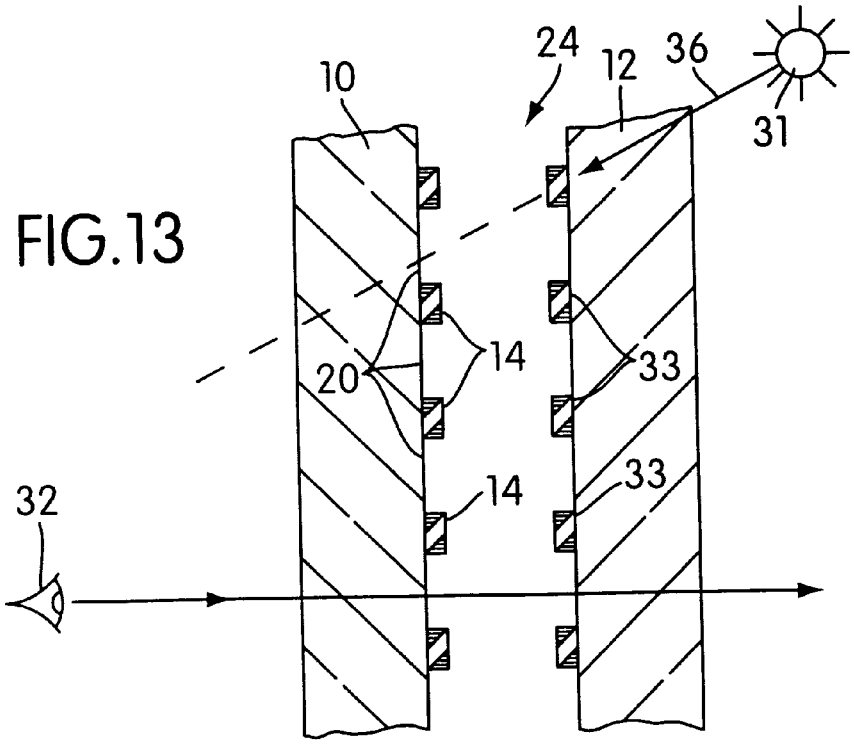

UNIDIRECTIONAL PANEL

Matter enclosed in heavy brackets [ ] appears in the original patent but forms no part of this reissue specification; matter printed in italics indicates the additions made by reissue.

FIELD OF THE INVENTION

This invention relates to panels and more particularly transparent or translucent panels having a design or pattern visible from at least one side and not the other.

BACKGROUND OF THE INVENTION

The term transparent panel as used herein includes a sheet of transparent material, a laminate of transparent materials or an assembly of transparent materials, such as glass or plastics, for example, acrylic sheets or polycarbonate sheets and including flexible materials such a polyester film or polyvinyl chloride film and also includes a transparent panel having an obscure or other distorted image effect. Similarly, the term translucent panel is intended to include a sheet of translucent material, a laminate of translucent materials such as glass or plastics, for example, acrylic sheets or polycarbonate sheets and including flexible materials such as polyester film, polyvinyl chloride film, paper, fabric or other material.

The incorporation of an opaque pattern on or into particular types of transparent panels in order to create unidirectional vision is already known in the construction of transparent walled squash courts, as seen in copending application Ser. No. 545,166 of Oct. 25, 1983. These panels include a continuous and opaque pattern applied in single color, or with the pattern appearing one color from one side of the panel but another color from the other side to enhance the one-way vision effect when one side of the panel is illuminated more than the other side. A single color pattern is normally white or a light color and a two color pattern is normally arranged to be white or light color on the one side of the panel and black or dark color on the other side of the panel. The patterns are superimposed with exact or near exact registration, an arrangement which [enhance] *enhances* the clarity of vision from the other side to the one side. Such materials can be used to enable spectators or television cameras to see through a squash court from one side while the players on the other side cannot see through the material to the other side and thus are not distracted by the crowds, etc. The pattern in such panels is normally one of small dots such that, the eye of a spectator in the audience who is at a distance from the panel cannot discern the individual elements of the pattern, the elements being too small for the eye to resolve.

[SUMMARY OF THE INVENTION]

A simple unidirectional vision panel comprises an opaque pattern of dots 1 mm in diameter and at a distance of 1.4 mm between the centers of adjacent dots on a square grid appearing white from one side and black from the other side, the other side being less illuminated than the one side. Light incident on the white dots is reflected and scattered, which has the effect of obscuring visibility from the one side into the other side. However, a substantially clear view is obtained from the other side [throught] *through* the panel into the one side, albeit the intensity of light of the image is reduced by virtue of the degree of opacity, giving a "toned down" effect to the image, not dissimilar to tinted transparent panels.

*SUMMARY OF THE INVENTION*

According to one aspect of the invention there is provided a panel comprising a colorless or light colored sheet of material and a design visible from one side of the panel and not visible from the other side of the panel, said design being superimposed on or forming part of a silhouette pattern (as herein defined).

A number of different vision effects are obtainable from different panels falling within the above definition. Thus clarity of vision can be maintained from the one side to the other side with the exception of the area covered by the design with clarity of vision through the whole of the panel from the other side to the one side. Visibility from the one side to the other side can be totally obstructed while there is clarity of vision throught the whole of the panel from the other side to the one side, in other words a unidirectional vision effect is obtained. Clarity of vision is obtainable from the one side to the other side except in the area of the design, while visibility from the other side to the one side is totally or partially obstructed. Vision from either side can be totally obstructed. In all cases, vision can be obtained in either direction through the panel when the level of illumination perceived through the panel from the far side of the panel sufficiently exceeds the illumination reflected from the near side of the panel.

According to another aspect of the invention there is provided a panel of transparent or translucent material having a first design visible from one side of the panel and not visible from the other side of the panel and a second design visible from the other side of the panel and not visible from the one side of the panel, each design being superimposed on or forming part of a silhouette pattern (as herein defined).

Examples of vision effects obtainable from the second aspect of the invention include clarity of vision through the one side to the other side with the exception of the area covered by the first design and clarity of vision through the other side to the one side except through the area covered by the second design. In another example, visibility through the panel from one side to the other side is totally or partially obstructed and visibility through the panel from the other side to the one side is totally or partially obstructed. In yet another example, visibility through the panel from one side to the other side is totally or partially obstructed, while clarity of vision is obtainable from the other side to the one side except through the area covered by the second design. In all cases vision through the panel can be obtained in either direction when the level of illumination perceived through the panel from the far side of the panel sufficiently exceeds the illumination reflected from the near side of the panel.

The panels of the invention can be illuminated and/or each design may be illuminated such that the eye will tend to concentrate upon the design on the panel or look through the panel and concentrate on an object or objects beyond the panel. In all cases vision can be obtained in either direction through the panel without any perception of any design or color of silhouette pattern, when the level of illumination perceived through the panel from the far side of the panel is much greater than the illumination reflected from the near side of the panel. In addition, it is a feature of the panels of the invention that the design and/or silhouette pattern becomes less perceptible from the side of the panel from which the design and/or silhouette pattern is normally visible as the level of illumination transmitted through the panel from the other side increases.

The design on one or both sides may be decorative and/or informative or for other purposes. The panel of the invention may also allow for the control of solar heat gain, glare or uv radiation received within, for example, a building, vehicle or other enclosure or shelter without unduly affecting the visibility outwards.

The invention allows the natural or artificial illumination of space to either side from the other side, so that, for example, a panel of the invention forming an advertisement can be placed in front of a building and still allow daylight to enter the windows, albeit of reduced intensity, coupled with vision out of the building.

The design on the panel of the invention forms or is superimposed on a pattern of opaque elements which is referred to herein as a silhouette pattern. The term "silhouette pattern", as used herein, is intended to mean any arrangement of opaque material which subdivides the panel into a plurality of opaque areas and/or a plurality of transparent or translucent areas. The silhouette pattern may be in many forms, for example, it may be a regular geometric element in a regular layout, a regular geometric element in an irregular layout, a free form element in a regular layout, a free form element in an irregular layout or a combination of regular and free-form elements in regular and/or irregular layouts. Instead of a number of separate elements with an interconnected transparent zone, the silhouette pattern can be formed by interconnected opaque elements with separate transparent elements, such as a net, grid or mesh pattern. The silhouette pattern can, if desired, be a combination of interconnected opaque elements and separate elements. All of such silhouette patterns may be repeated over a unitary panel to produce large areas or a large panel can be made up from smaller panels, for example, in the manner of tiles.

The elements forming the silhouette pattern are normally small, such as dots, preferably of equal size on a regular grid, sometimes referred to in the printing industry as a "halftone". In certain circumstances, in particular where vision through the panel is required, a silhouette pattern made up of discrete elements may be preferred to a silhouette pattern formed by [continous] *continuous* or interconnected opaque arrangement such as a net, grid or mesh. It would appear that it is [optionally] *optically* more efficient to see through areas between a regular array of discrete opaque elements such as dots or discs than through the transparent areas defined by an opaque grid, the total opaque area being the same in both cases. The explanation is possibly that the forward scattering cross-section of an opaque dot or disc is greater than that provided by [continous] *continuous* opaque strips or lines which make up the grid. In addition, light rays which are diffracted around the perimeter of an opaque obstruction contribute toward a more coherent image if the obstruction is a disc having a more uniform light path around it than is obtained when light is diffracted around the edge of a strip or line. The optical efficiency of a silhouette pattern can be calculated or assessed in much the same way as with diffraction gratings.

There are, also, physiological aspects connected with the ability of the eye to resolve the components of a fine pattern at a distance and the ability of the brain to recognize shapes such as lines or grids more easily than discrete elements such as dots. The more [recongizable] *recognizable* the pattern, the less easily an object can be perceived through the patterned panel.

Where the silhouette pattern is more discernable, such as a grid or other arrangement of continuous lines, the impression is psychologically less pleasing than a silhouette pattern of discrete elements, such as dots. This may be because a grid or like pattern is associated with confinement or prison.

A silhouette pattern of discrete elements comprising two superimposed opaque materials is easier to produce than a grid of two superimposed opaque materials.

The elements of a silhouette pattern may be such as to mask or obscure a letter or numeral or goup of letters or numerals to be capable or forming part of an elemental typographical design, such as dot matrix letter or number styles, such that relatively small written or numerical information can be clearly visible from one side but a uniform or irregular design is seen from the other side. The pattern may be graded or successively toned down by reducing the size of the individual elements and/or increasing the spacing between individual elements, this being useful, for example, if it is desired to have a varying reduction of solar glare or solar gain within a building or vehicle. This kind of grading may be formed so as to be apparent on both sides of the panel or on one side of the panel only. For example, white dots on the outside of a panel can be of the same size to give a uniform or near uniform impression from the outside, whereas larger, underlying black dots on the inside can be graded in size, on the same grid, for example to give a graded protection against solar glare, the dots being larger at the top of a vehicle windshield than they are lower down. The reverse effect with the black dots being larger at the bottom of the panel is also beneficial in allowing more solar gain through the top of a panel from the low winter sun. External shading can be used to protect the top of the panel from the high summer sun. The dark colored pattern on the inside of the panel may have the effect of absorbing solar heat by virtue of the dark colored pattern overlapping the pattern of a lighter color or of reflective material on the outside of the panel whose principal purpose is to create a one-way visual effect.

A silhouette pattern may be placed upon two or more surfaces of a glazing or other panel assembly, for example, a laminate having a plurality of surfaces, to further control the visibility through such a panel and/or to further control the reduction in solar heat gain, glare or uv radiation. The incorporation of two or more silhouette patterns can be used to create special visual effects from the superimposed patterns. For example, if the silhouette pattern is a pattern of horizontal lines on two spaced apart but parallel surfaces, the visibility through the two pattern planes will vary depending upon the angle of vision in relation to those patterns. If the two silhouettes patterns are the same and are disposed to allow preferred visibility in a certain direction, such as horizontally out of a window, by approximately aligning the silhouette patterns in that direction, this provides an improved shading of solar heat gain, glare and uv radiation from the sun from a higher than horizontal angle without significantly affecting horizontal visibility. A particularly effective use of this arrangement is in a car rear window, which would normally be inclined. A lined silhouette pattern in two planes, with lines horizontal and approximately aligned from the driver's head or rear window mirror position provides significantly increased solar shading from the sun than the same pattern would provide in just one plane. Alternatively, the patterns can be arranged to be relatively adjustable, for example, one panel being capable of movement in its own plane such as a sliding arrangement, that would enable the control of visibility from either side of the assembly from any given angle.

The silhouette patterns can be relatively adjustable in more than one direction. For example, where the assembly includes a plurality of panels each having a silhouette pattern, one panel can be adapted for movement both in its own plane and perpendicular to another panel, so as to allow a wide range of solar control, up to total exclusion of direct solar rays through the assembly, while maintaining visibility through the assembly and a wide range of visibility control, including total obstruction of vision from either side of the assembly from any given angle. The degree of increased solar shading provided by two or more patterned panels can be controlled by manual or automatic devices, which may be temperature responsive or dependent on solar radiation.

A further use of patterns on two or more planes is to create a design effect that varies with the angle of vision, the variation of light intensities outside or within such an assembly, or by moving one or more pattern relative to another pattern. For example, a silhouette pattern of vertical lines on either side of a single panel or one side of two panels in an assembly will still allow visibility through the assembly from either side. However, the two silhouette patterns can be colored with designs that produce a varying visual effect depending on the angle of vision of the observer. If two or more panels with silhouette patterns have external and intermediate lighting, the visual effect can be varied by varying the relative intensity of lighting. For example, if a near panel is brightly illuminated but a rear panel relatively dark, only the design on the near panel will be perceived. However, if the near side of the near panel is made dark and the intermediate space brightly illuminated, the design on the near panel will not be clearly visible but the design on the rear panel and any intermediate object will be clearly visible.

Various effects, such as interference patterns, can also be created by superimposing two silhouette patterns and a changing interference pattern effect can be produced by moving one pattern relative to another, for example by a cam. Alternatively, changing interference patterns can be seen by a moving observer looking at fixed patterns and designs and this effect can have practical use as well as decorative or other visual effect. For example, the invention can be used in conjunction with existing interference pattern systems for navigational purposes by enhancing the visibility of, or the information given by, such systems. It will also enable new practical systems to operate without rear illumination, such as is presently required, by using ambient lighting or lighting directed by the observer. In some embodiments only one silhouette patterned panel is required, a rear panel being totally opaque, with or without a design or of partially or completely mirrored or other reflective finish.

The transparent area of the transparent product can be of two or more different colors, to provide additional design effects, though the mirror image of these effects will normally be visible from the other side, unlike designs superimposed on the silhouette pattern.

The invention has so far been principally described in relation to transparent materials. However, the invention is also applicable to translucent materials, where it is required to create a different image from one side than from the other side of a translucent panel that can still transmit light, for example, as commonly used in Japanese style room partitions, such as Shoji screens.

To further understand the preferred embodiments of the present invention reference should be made to the attached drawings and descriptions thereof which form a part of this disclosure.

Figure 16:
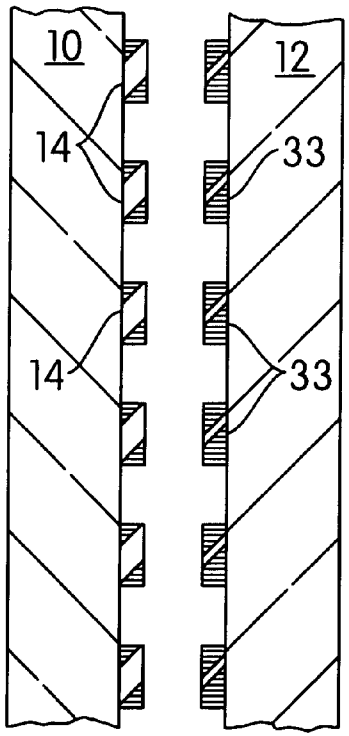
Figure 15:
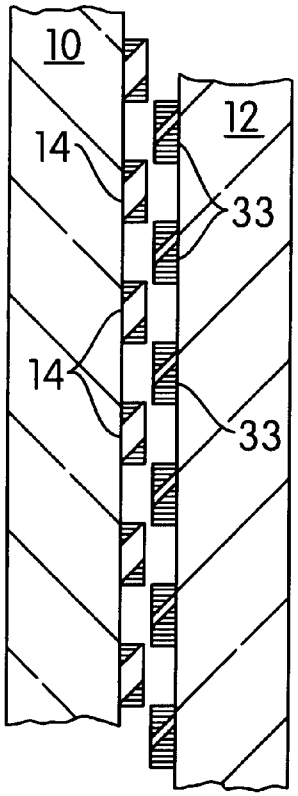
Figure 14:
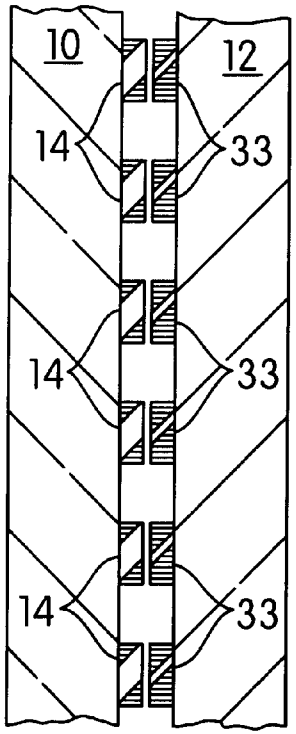
Figure 17:
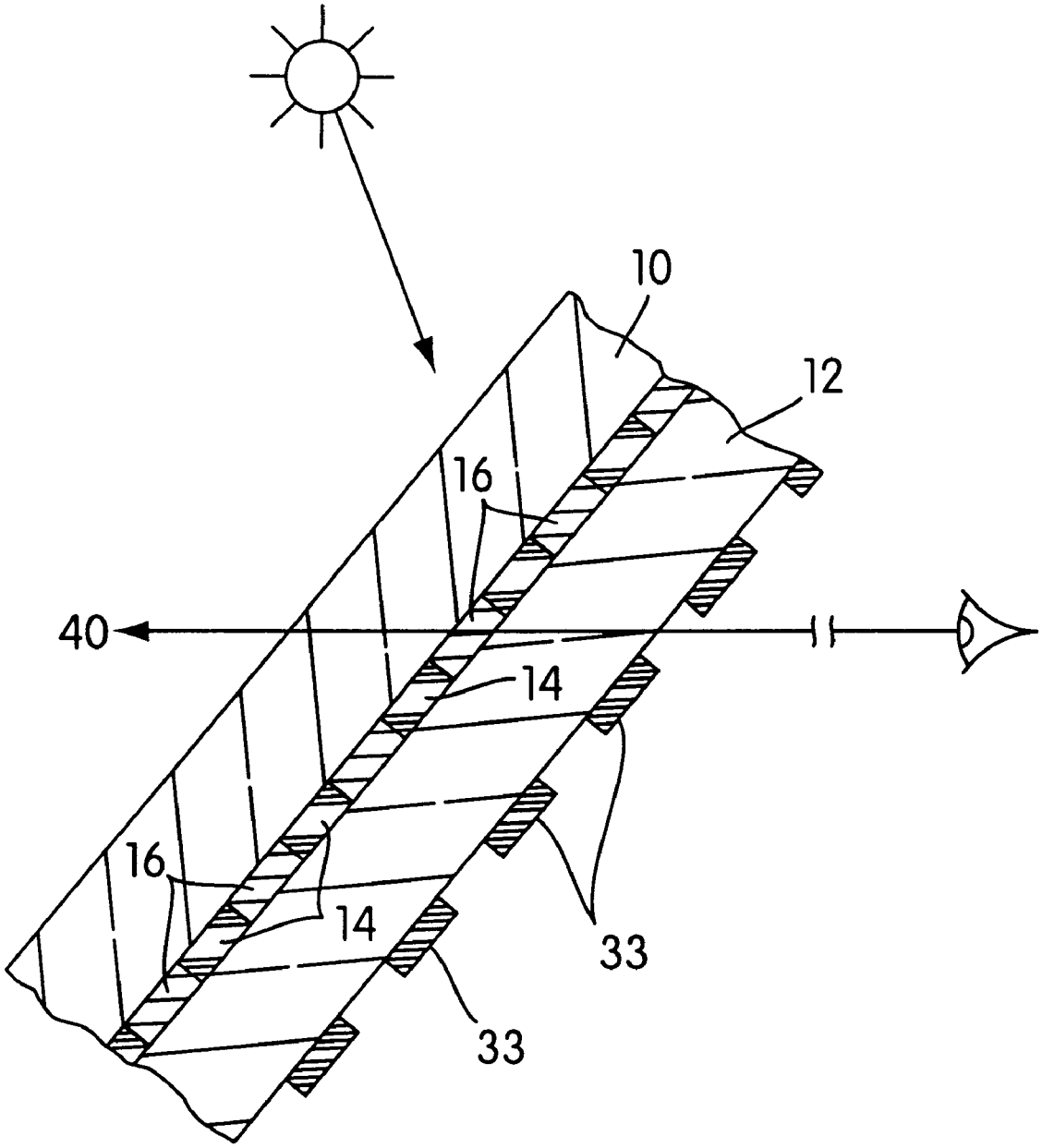

FIGS. [17–12] *7–12* are transverse sectional views through panels showing how the silhouette pattern and design can be protected;

FIG. 13 is a transverse sectional view through two spaced apart panels of the invention;

FIGS. 14–16 show the panels of FIG. 12 in different relative dispositions;

FIG. 17 is a transverse sectional view through panels forming a vehicle window; and FIGS. 18–25 illustrate diagrammatically, and not to scale, steps in methods of producing the panels of FIGS. 1–5.

Figure 26:
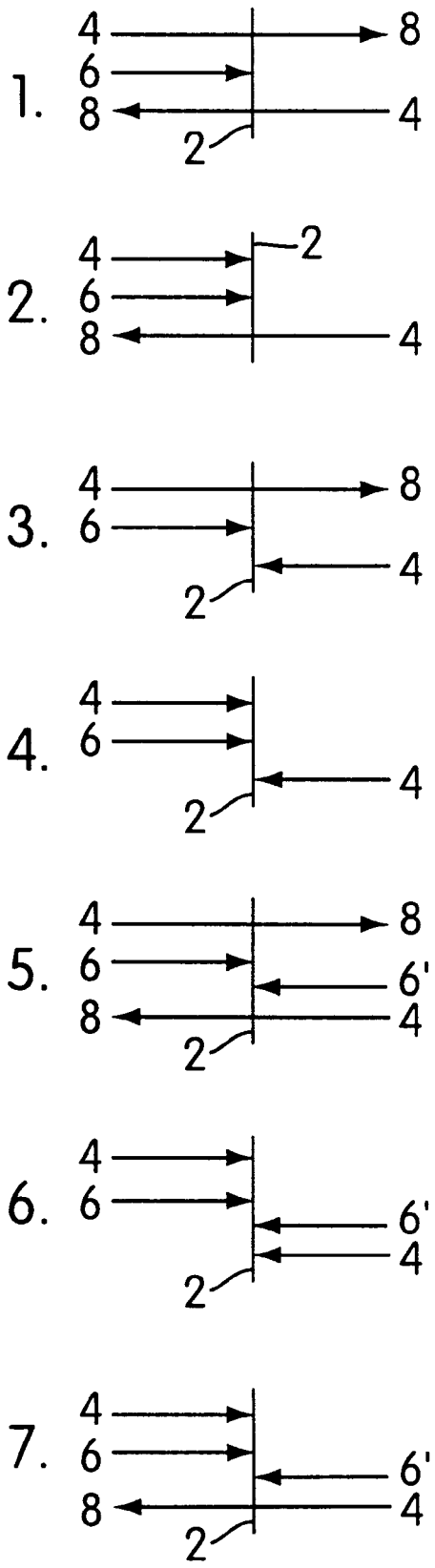
Figure 27:
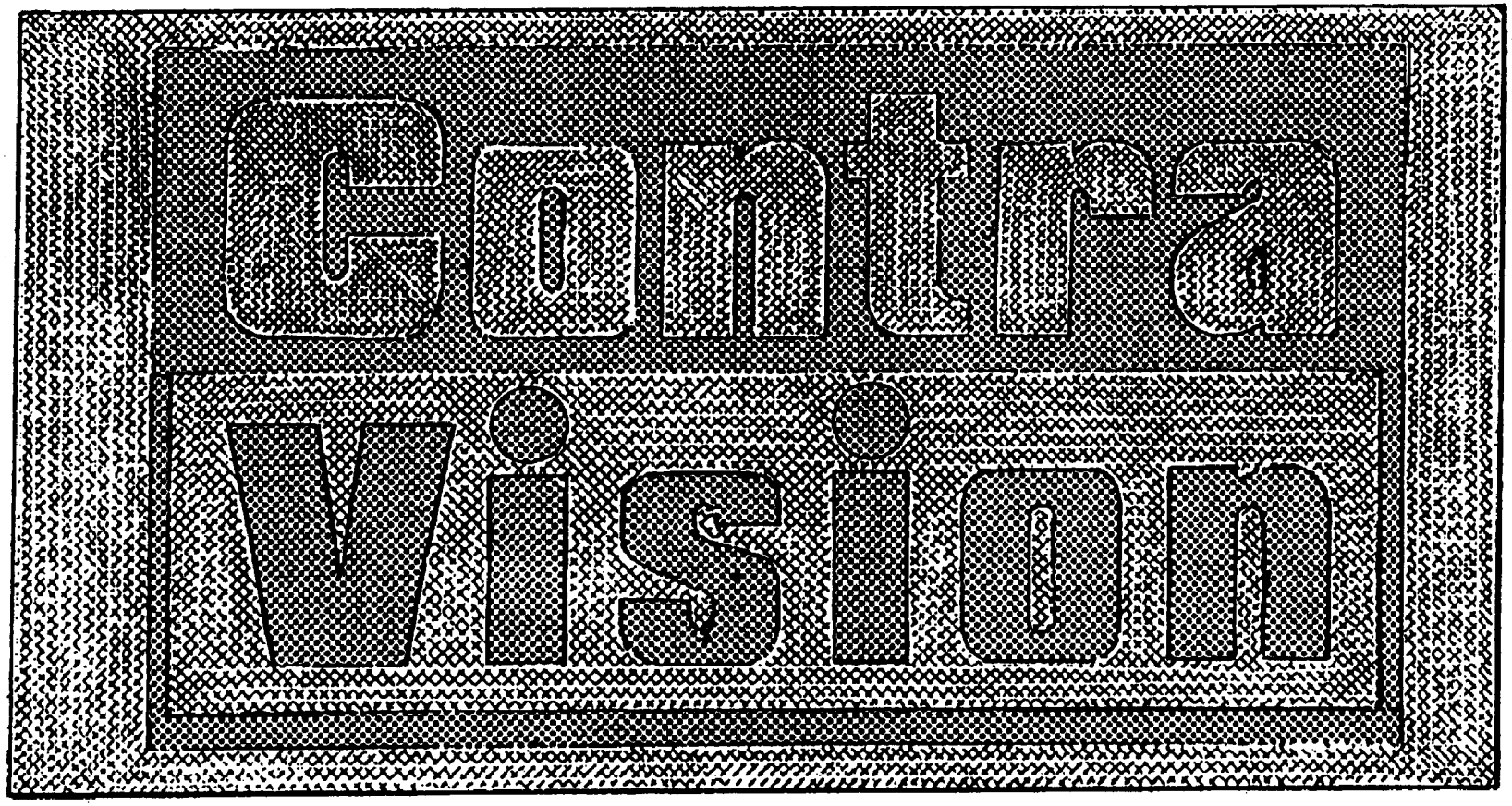
Figure 28:
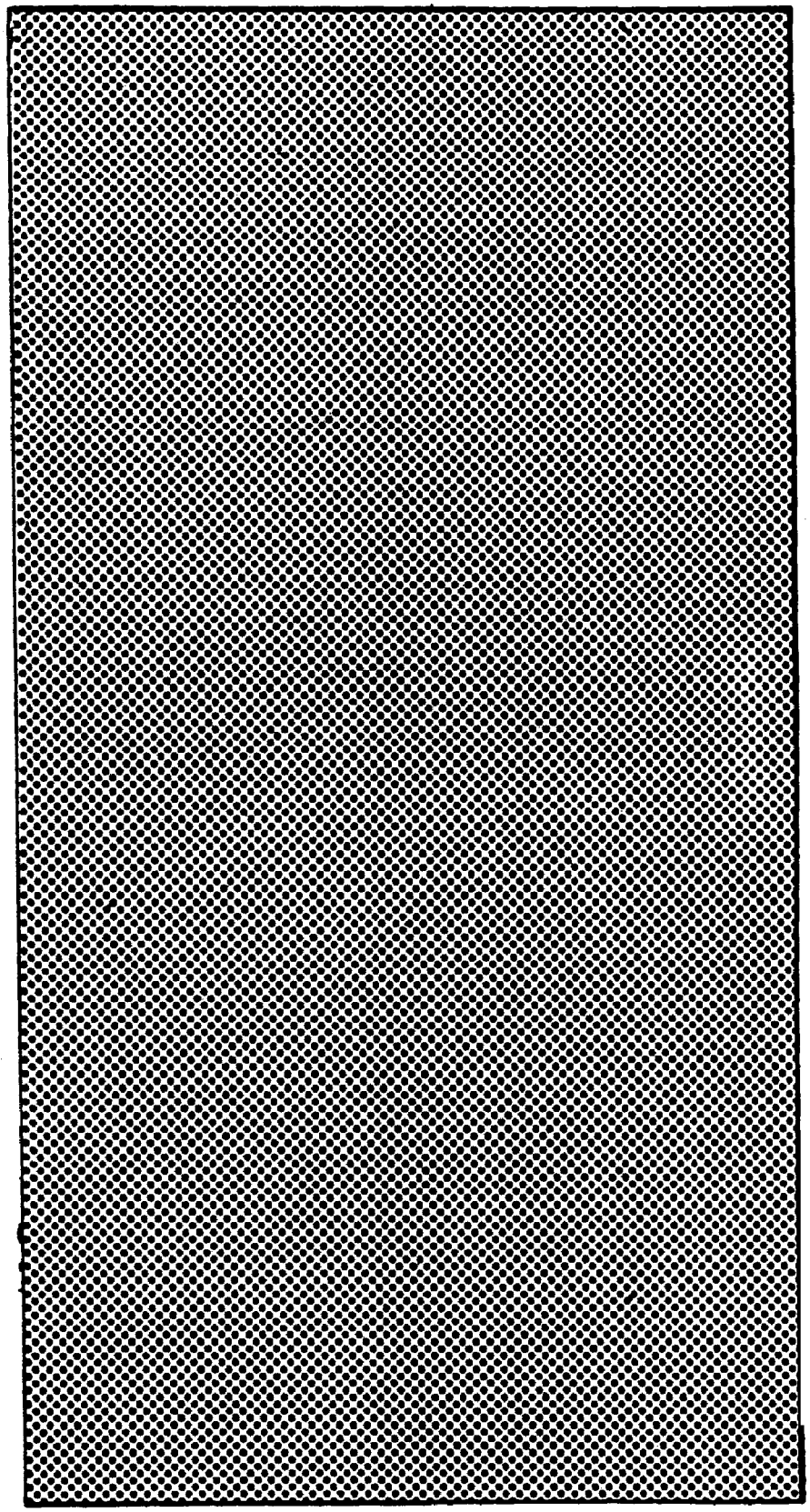
Figure 29A:
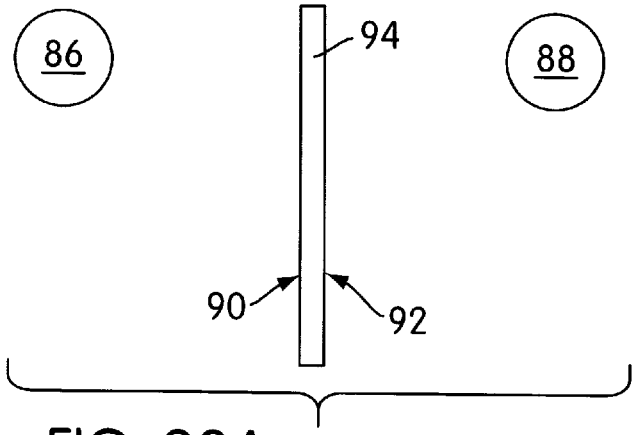
Figure 29B:
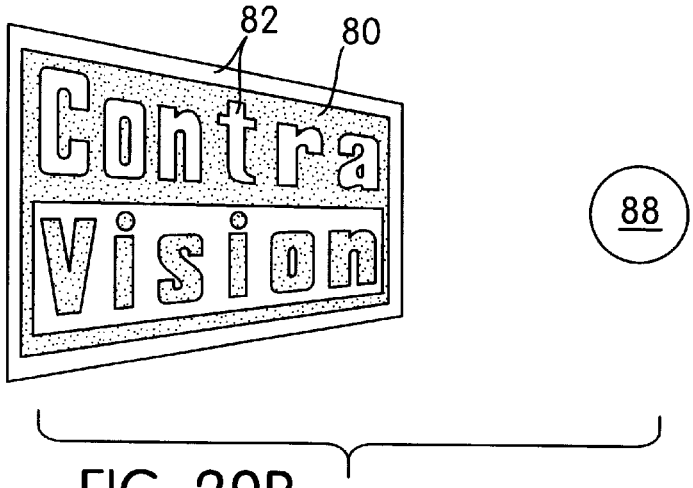
Figure 29C:
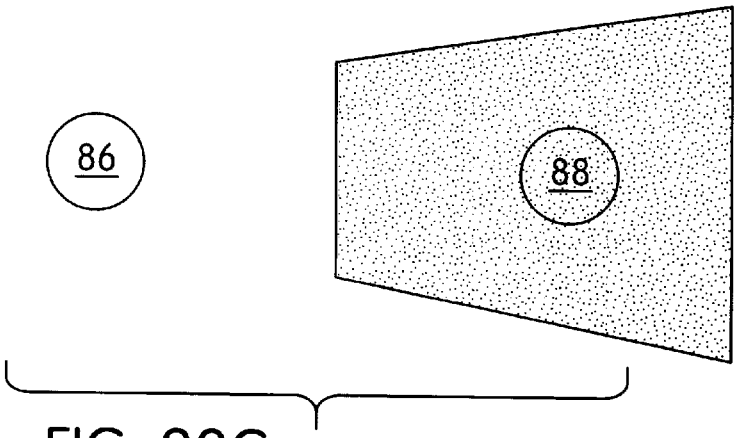
Figure 30:
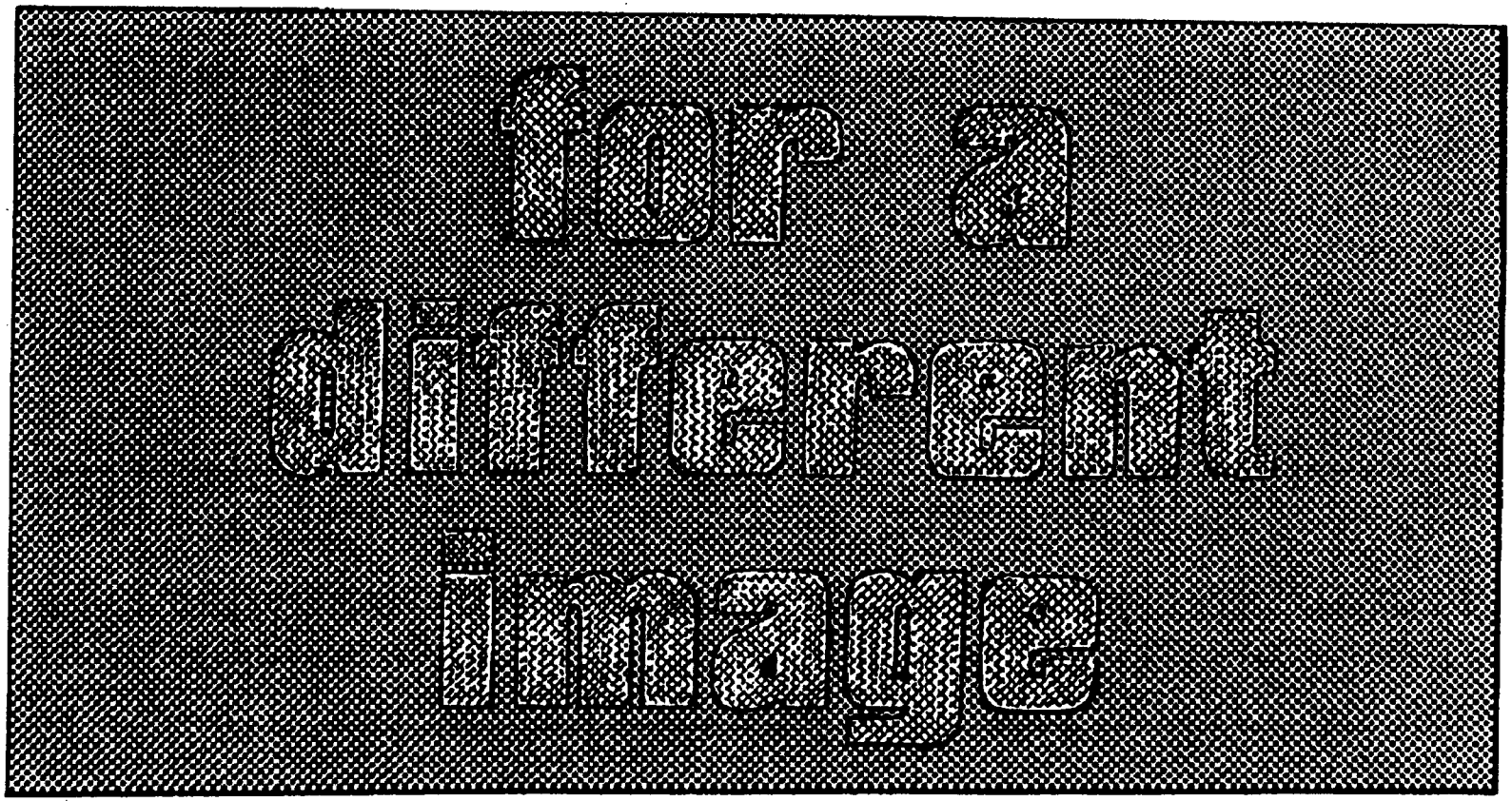
Figure 31A:
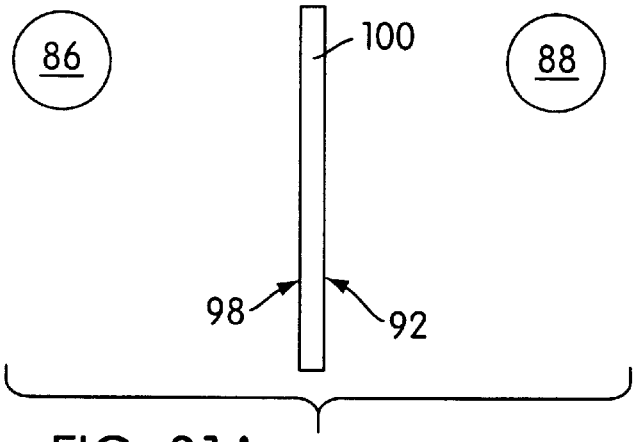
Figure 31B:
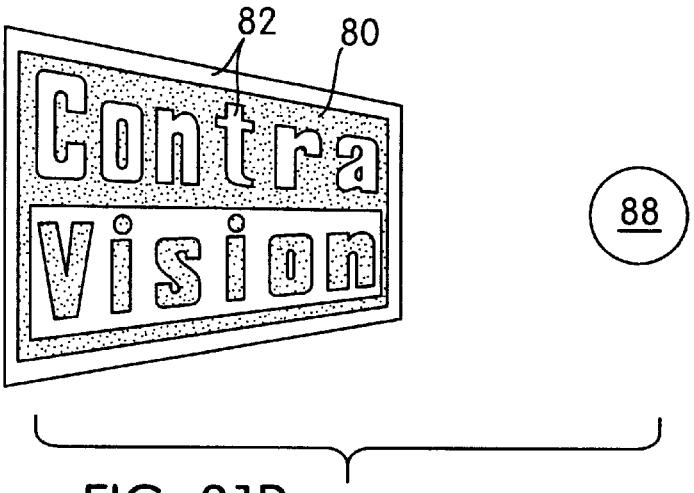
Figure 31C:
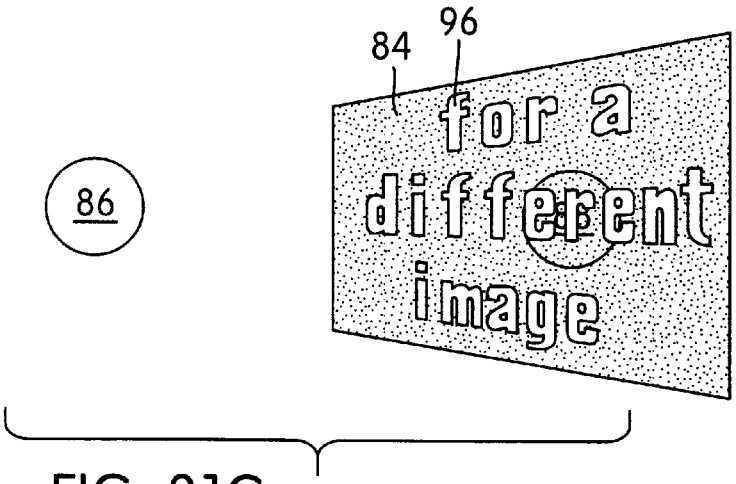
Figure 32:
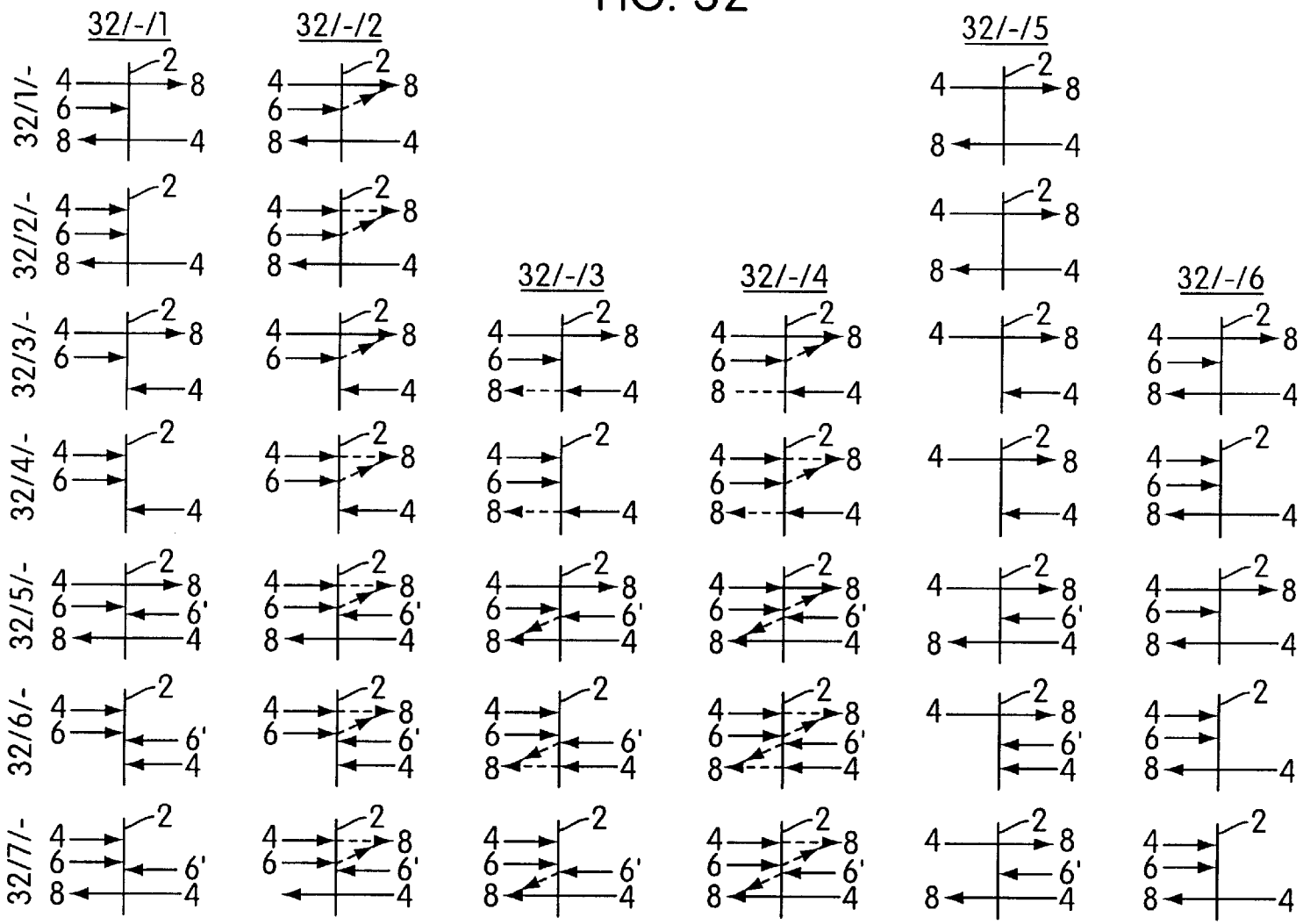

FIG. 26 represents seven different examples of different vision characteristics obtainable from the invention;

FIG. 27 illustrates one side of a panel of the invention with a design;

FIG. 28 illustrates one side of a panel of the invention without a design;

FIGS. 29A–C illustrate the differential vision effects of a panel with a design on one side;

FIG. 30 illustrates one side of a panel of the invention with a different design;

FIGS. 31A–C illustrate the differential vision effects of a panel with a design on both sides;

FIG. 32 represents thirty-six different vision control effects achievable by panels of the invention.

DETAILED DESCRIPTION OF THE INVENTION

In the various embodiments, like parts have been given the same reference numerals.

Figure 1:
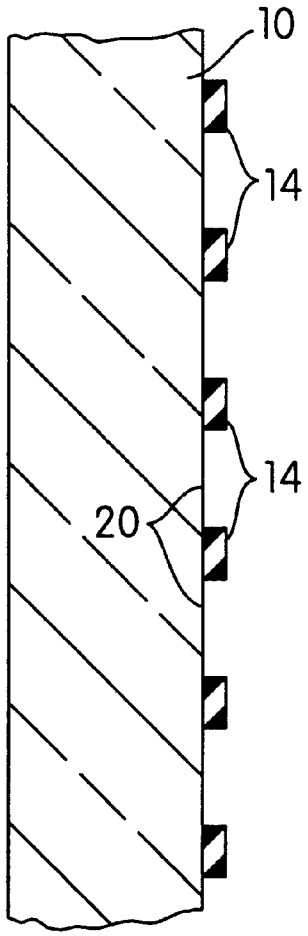
FIG. 1 is a transverse sectional view through a panel having an opaque silhouette pattern.

Referring to FIG. 1, the panel therein illustrated comprises a transparent colorless sheet of material 10 having a regular pattern of opaque ink 14 applied to one side thereof.

Figure 2:
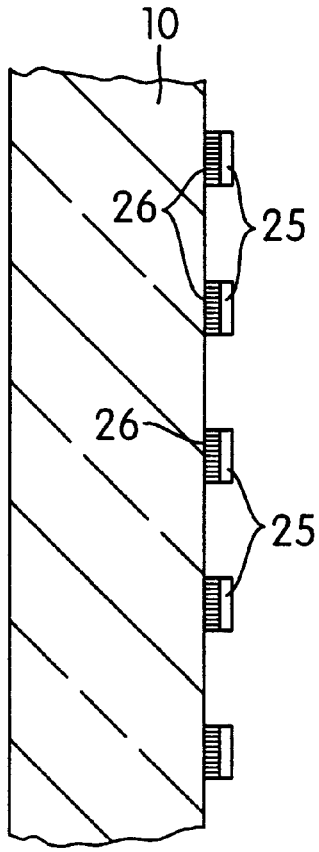
FIG. 2 is a sectional view similar to FIG. 1 of a panel having a two layer silhouette pattern.

The panel of FIG. 2 has a regular pattern of dark ink 26 on one side of the sheet 10 and is superimposed by light colored or light reflective ink 25. When viewed from the front (that is from the right as illustrated in FIG. 2) the light colored pattern 25 has the effect of inhibiting vision through the panel. From the other side, however, the less reflective dark colored pattern 26 does not prevent vision through the panel. This one way effect is further enhanced if the level of illumination on the front of the panel is greater than at the rear.

Figure 3:
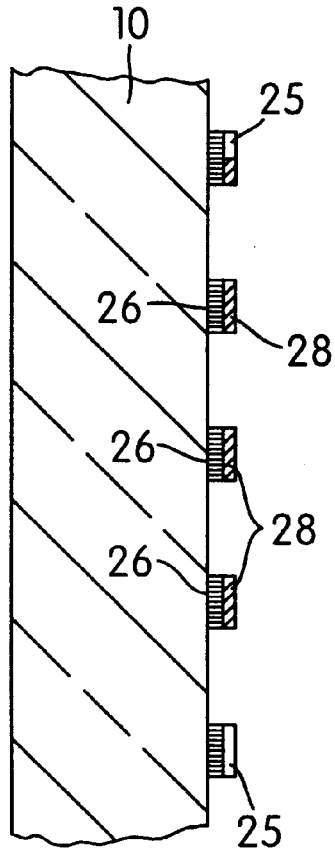
FIG. 3 is a sectional view similar to FIG. 1 of a panel having a silhouette pattern and a design on one side of the pattern.

The panel of FIG. 3 is similar to that of FIG. 2 except that part of the light colored ink pattern 25 is replaced with ink which is of a different color 28. The relative arrangement of the inks 25 and 28 can be such as, for example, to create a design conveying information of some kind. Thus, the panel when viewed from the front appears opaque and will display that information readily, whereas when viewed from the rear the design cannot be seen but the panel will appear transparent.

Figure 4:
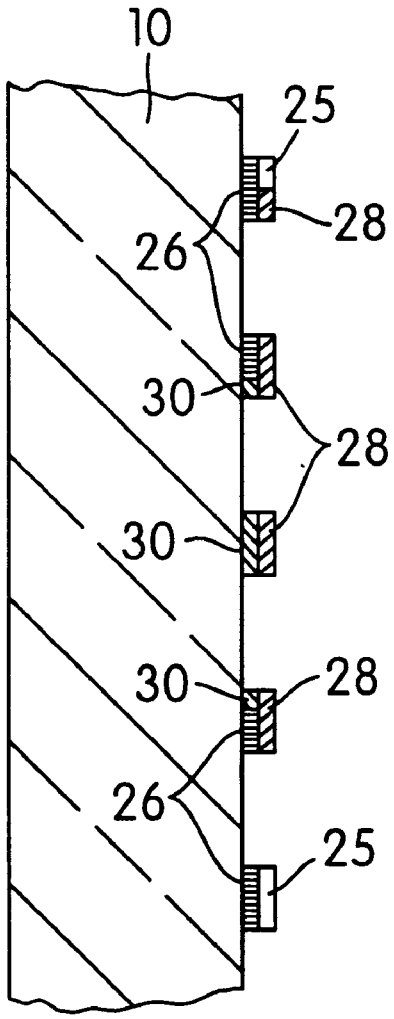
FIG. 4 is a sectional view similar to FIG. 1 of a panel having a silhouette pattern and designs on both sides of the patterns.

Referring to FIG. 4, the panel is similar to that of FIG. 3, except that part of the dark ink pattern 26 is replaced by a lighter design 30. This panel, therefore, displays a design 28 which can be seen from the front but not the back and a design 30 which can be seen from the back but not the front. In addition, the panel has a one-way vision effect in that it appears opaque from the front and transparent (apart from design 30) from the back.

Figure 5:
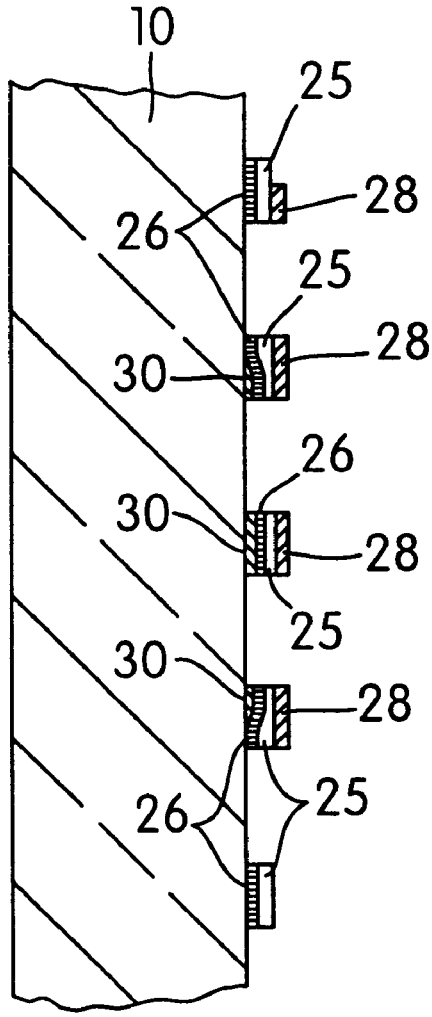
FIG. 5 is a sectional view through another embodiment similar to that of FIG. 4.
Figure 6A:
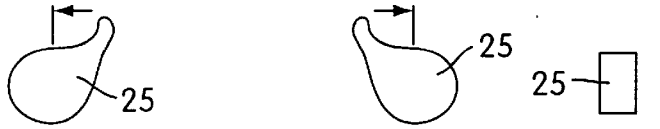
FIGS. 6A–F illustrate the appearance on either side and in sectional views of different various kinds of element that can be used to form a silhouette pattern.
Figure 6B:
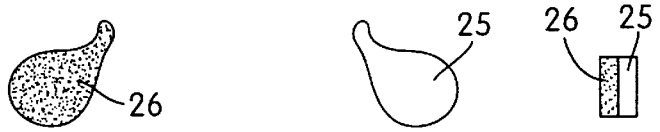
Figure 6C:
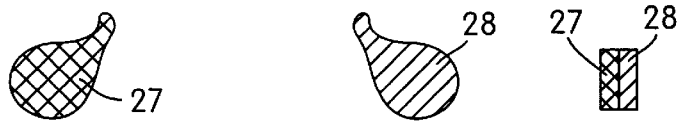
Figure 6D:
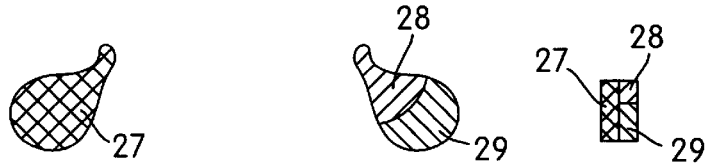
Figure 6E:
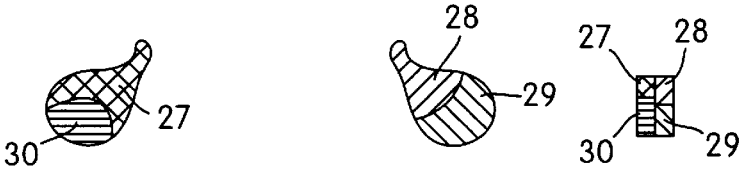
Figure 6F:
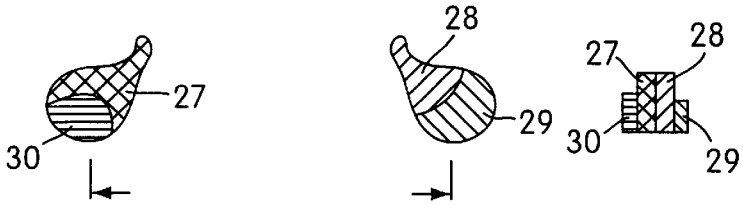

The panel of FIG. 5 has the same visual appearance as that of FIG. 4 but has a different construction in that the design 30 is located between the dark ink pattern 26 and colorless sheet 10 instead of replacing part of the pattern 26 and design 28 is superimposed on the pattern 25 instead of replacing it.

FIG. 6 illustrates different examples of constructions of elements that can form a pattern on a panel. Thus FIG. 6A shows an element of uniform color 25. If this element is white or other light color and such elements are applied at appropriate spacings throughout a panel, a simple unidirectional effect is achieved with appropriate lighting. FIG. 6B shows a two layer element which is black or dark color 26 on one side and white or light color 25 on the other side, which can provide a more effective unidirectional vision panel than element 6A, having improved vision from the one side to the other side. FIG. 6C shows another two layer element which is one color 27 on one side and another color 28 on the other. This illustrates a type of element which can be used to form a panel with different colored designs on each side thereof. FIG. 6D shows a two layer element which is a uniform color 27 on one side and on the other side has an area 28 of one color and a second area 29 of a different color. This illustrates a type of element which would be bisected by the line of a colored design on one side of a panel. The element of FIG. 6E is another two layer element having two areas on each layer of different colors, namely areas 27 and 30, in one layer and areas 28 and 29 in the other layer, FIG. 6F is an element which consists of a two layer element like that of FIG. 6C on a part of which side of which a further layer of a different color 29 and 39 is applied. The appearance of the element of FIG. 6F is the same as that of FIG. 6E.

Figure 7:
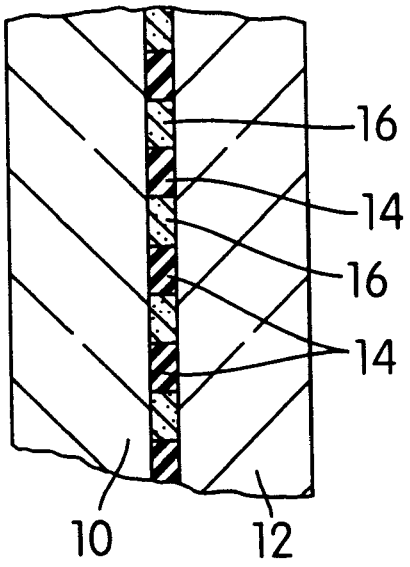
Figure 8:
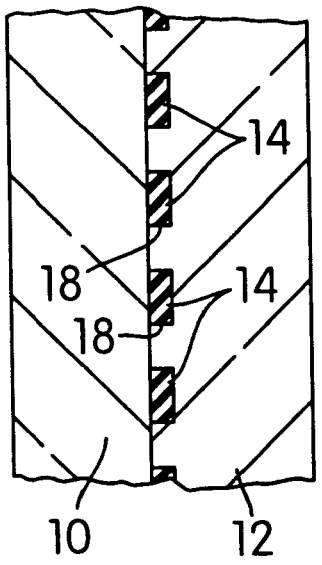
Figure 9:
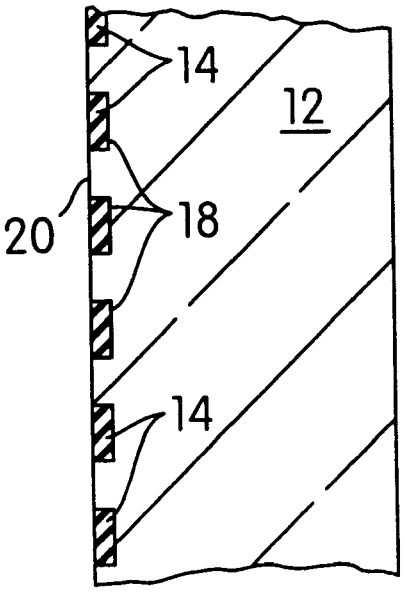
Figure 10:
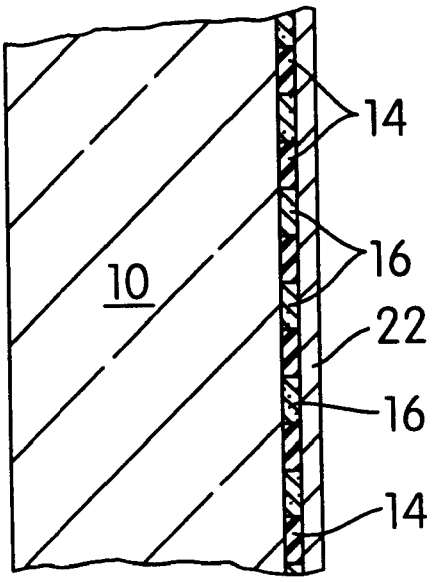

The pattern and design applied to a panel can be protected in a number of different ways. For example, as shown in FIG. 7, the pattern 14 can be covered by a transparent sheet 12 bonded to sheet 10 by adhesive 16. In FIG. 8, the pattern 14 is protected by sheet 12 bonded directly to sheet 10 and provided with recesses 18 in which the pattern 14 is received. In FIG. 9, the pattern 14 is located in recesses in a colorless sheet 12. The panel of FIG. 10 has its pattern 14 protected by a thin protective cover layer 22 bonded to sheet 10 by adhesive 16. FIG. 11 shows the pattern 14 provided on the inner surface of a sheet 10 which is part of a double glazing or like assembly having a second sheet 12 spaced from sheet 10 and defining an air gap 24.

FIG. 12 shows pattern 14 provided on the inner surface of the thin cover layer 22 bonded to sheet 12 by adhesive 16, sheet 12 being part of a double glazing or like assembly having a second sheet 10 spaced from sheet 12 and defining an air gap 24. The air gap 24 need not exist and/or the thin cover layer 22 can be held between sheets 10 and 12 without adhesive 16.

FIG. 13 illustrates a double glazing assembly similar to that of FIG. 11 except that a second pattern 33 is provided on the inner surface of sheet 12 also. This arrangement permits horizontal vision as indicated by arrow 32. However, in addition to pattern 14 being opaque to sunlight striking the assembly, pattern 33 on sheet 12 is also opaque to sunlight striking the assembly and does not allow the normal passage of rays of sunlight such as 36 which would otherwise have passed through the transparent areas 20 between pattern 14 on sheet 10.

FIG. 14 shows a transverse section through two sheet(s) 10 and 12 with patterns of horizontal lines 14 and 33 printed in one color or according to the invention on the adjacent surfaces of the two panels.

If the two patterns are aligned and touching or nearly touching, vision through the panel is permitted at any angle. If one sheet 10 is moved in its own plane such that the two sheets are still touching or nearly touching but lines 14 block the gaps between lines 33 and lines 33 block the gaps between lines 14 as in FIG. 15, vision through the panel is prevented. If one sheet 10 is moved perpendicular to its own plane such that the lines, 14 and 33 are still aligned horizontally, as in FIG. 16, the lines can provide additional or total shading of solar radiation. To avoid abrading the patterns of lines with panel movement, they may be recessed into the panels or separated by a narrow sliding bearing material, such as perpendicular Teflon strips, or otherwise kept slightly apart.

Thus, with normal daylight conditions, outside sheet 12 and sheet 10 being internal with the sheets disposed as in FIG. 14, the silhouette pattern of lines 33 is of a color or design according to the invention to achieve privacy inside. If desired, increased solar shading can be achieved by moving sheet 10 away from sheet 12, if necessary, to provide shading of solar radiation as achieved in FIG. 16. At night, or when there is relatively strong internal artificial lighting, privacy can be maintained by moving sheet 10 as required to reduce the transparency of the assembly, if necessary to the total obscuration of vision through the panel as achieved in FIG. 15.

Sheet 10 can be internal relative to sheet 12, but in the gap of a multiple glazing assembly, sheet 12 being external.

Sheet 10 and/or 12 can be capable of being heated, for example the lines 14 and/or 33 being heating elements, to ensure that the alignment of the two patterns of lines 14 and 33 is not adversely affected by differential thermal expansion of the sheets.

The vehicle window assembly of FIG. 17 consists of a pattern 14 disposed between sheets 10 and 12 and a second pattern 33 applied to the outer surface of sheet 12 which forms the inner side of the vehicle window. The relative disposition of patterns 14 and 33 is such that horizontal vision from within the vehicle is possible as indicated by arrow 40, whereas sunlight striking the assembly from above penetrates to a lesser extent into the vehicle than if only pattern 14 or pattern 33 were incorporated.

The forming of such a silhouette pattern over a large area, each element of the pattern being of different colors superimposed with as exact registration as possible, is difficult but methods which may be used are disclosed in British Patent Application Nos. 2,032,417A and 2,118,096A. Other methods include the following:

(a) A stencil pattern with ink repellent poverties is applied to a substrate, for example, by any printing technique, by transfer or like method. Two layers of different colored inks or other marking fluids, are successively applied. The colored inks are repelled by the stencil material but remain on the substrate in between the stencil material. The stencil material is then removed by a solvent, by heat or other means.

(b) The required pattern is applied to the substrate by printing or other technique in one color and a photosensitive material, when exposed to light from the opposite side of the transparent substrate and developed, leaves a contrasting color exactly superimposed upon the original pattern.

(c) The required pattern is applied to the substrate by printing or other technique in one color. A photosensitive material when exposed to light from the opposite side of the transparent panel and developed, forms a stencil applied to the area between the elements of the original pattern. A contrasting colored ink or other marking fluid is applied over the whole substrate and the stencil is then removed by water, heat or other means, taking with it the second color but leaving the two colors superimposed in the required pattern.

(d) An electro-plating resist having the desired pattern is applied to the substrate by printing, photostencilling or other technique. The panel is then plated with two materials of contrasting color and the stencil removed by solvent, heat or other means to leave the two superimposed colored materials in the pattern defined by the resist.

(e) A [shelf-adhesive] *self-adhesive* stencil, for example, perforated polyester film with a self-adhesive applied, is secured to a substrate. Two layers of ink or other marking fluid of different colors are successively applied to the whole substrate. The self-adhesive stencil is [them] *then* pulled from the substrate leaving the required pattern in two colors, each color [is] *in* accurate registration with the other. The self-adhesive stencil may be in two or more layers, to allow a single layer [or] *of* stencil material to be removed after the application of a layer of ink or other colored marking fluid.

(f) The required pattern is applied to a substrate by printing or other technique in one color. A second ink or other mixing fluid of a different color that adheres well to the first color material but not to the substrate is then applied. If necessary, any material between the required pattern can be removed by abrasion, self-adhesive film application and removal or other means to leave this area clear and transparent but the two colors superimposed in the required silhouette pattern.

(g) A stencil pattern is applied to the panel [of] *by* printing or other technique, the stencil material not having good adhesion to the substrate. Two layers of ink or other marking fluid of different colors that have good adhesion to the substrate and each other, are successively applied over the whole panel. The stencil material is removed and with it the ink or other marking fluid immediately thereabove by abrasion, self-adhesive film application and removal of self-adhesive film or other means to leave the area formerly covered by the stencil clear and the transparent and two colors superimposed elsewhere on the substrate.

(h) The silhouette pattern is formed on a carrier paper, the elements of the pattern normally being printed or "kiss die cut" and the pattern applied to a panel by dry transfer. The silhouette pattern is adhered to the carrier paper by relatively medium tack adhesive and may be ink, two sheets of film laminated or a single sheet of film printed to provide the different colors. If a film material is used, the desired silhouette pattern is "kiss die cut" and the unwanted area of material removed. Adhesive on the opposite side of the pattern to the carier paper has a relatively high tack adhesion to the transparent panel after a protecting "release paper" with a relatively low tack adhesion is removed and the pattern pressed against the transparent substrate. The carrier paper is then removed, leaving the pattern adhered to the substrate with clear transparent areas between the elements of the pattern.

(i) A self-adhesive or static cling film, for example, of polyvinyl chloride, can be printed by any of the previously mentioned techniques and applied to a transparent sheet or flexible material.

Each of these techniques may be adapted to repeated application or by masking or other means as will be described to create a design on one side which when viewed from one side is different than any design on the other side and cannot be seen when viewed from the other side. Such products may be referred to as differential designs.

To produce differential designs, the following adaptations of the previously identified two color techniques are particularly applicable.

1. Applying the design by screen, litho or other printing process, including overprinting overall or a part of the silhouette pattern in two or more colors, with as exact registration of each layer as possible. The dots, lines or other elements of the pattern may be printed larger in certain colors than others to avoid seeing particular colors on the opposite side to that intended because of inexact registration.

2. The application of the required design and pattern printed as in method 1 or any other method, by transfer or decal. If required, more than one of these can be placed side by side to build up the required area. More exact registration can normally be achieved in relatively small areas on flexible materials. By applying such a transfer or decal having ceramic inks to glass, the carrying membrane can be burnt off in a toughening furnace, the ceramic ink being fused into the surface of the toughened glass. The term transfer includes dry transfers, water slide transfers and any other means of transferring a pattern on or from a carrying membrane.

3. Using a screen, litho, or any other printing process, to apply one layer of the silhouette pattern in one or more colors, being the pattern and design, [of] *if* any, that will be seen from one side, using ink or other marking material that adheres relatively well to the substrate. Alternatively, the silhouette pattern can be printed using a clear ink or other marking material that adheres relatively well to the substrate. A partially processed substrate may be mass produced with a black or clear or other silhouette pattern applied, the remaining stages of the process being carried out to suit individual requirements. The remainder of the silhouette pattern and/or design is applied over the silhouette pattern using ink, powder or other material that adheres well to the first colored ink or marking material but not to the base material, "blocking out" areas rather than printing the silhouette pattern. If necessary, any material between the required pattern can be removed by abrasion, self-adhesive film application and removal or by other means to leave that area clear and transparent and also leave the required colors superimposed in the required silhouette pattern with superimposed design.

In one example of this process a polycarbonate sheet is first screen printed with the required design on one side, to the required silhouette pattern with PVC ink. When dry this is then overprinted, "blocking out" each required area of color, normally in successive layers, using a cellulose based ink. When the overprinting is dry, the unwanted areas of ink between the elements of the silhouette pattern are removed by the application of high tack self-adhesive film, and the removal of the film, the unwanted areas of ink adhering thereto. The self-adhesive film can more economically be applied in large areas in a laminating machine and can be pre-cut in strips to facilitate removal. The self-adhesive film may also be applied to and removed from rigid or flexible substrate by being drawn from a reel and passed between nip rolls with the substrate before being re-reeled, the substrate being reeled or sheeted as required. Alternatively, the self-adhesive film can be kept as a protective layer and removed just before the product is used. Also the adhesive may be such as to leave a residue on the ink after the removal of the protecting film, thus facilitating adhesion of the product to another surface, for example a polyester film to a glazing assembly.

4. A stencil to produce the required silhouette pattern is applied to the substrate. The required design is then applied in inks or other marking materials by printing, spraying or other technique in successive layers, "blocking out" areas rather than applying the required silhouette pattern. The stencil is then removed with the ink or other marking fluid laying above it, leaving the required colors superimposed in the required silhouette pattern and design.

A partially processed substrate may be mass produced with an applied stencil and, if required, one or two layers of marking fluid over the stencil, the remaining stages of the process completed later to suit individual products.

There are many different possible stencil materials each with one or more methods of removal, together with the unwanted ink or other marking material upon them. The stencil may be preformed, such as a perforated film, or printed to be a photo-stencil produced by exposing a photo-sensitive layer to light through artwork and developing to achieve the required stencil pattern or other technique of forming a stencil pattern. A sufficiently strong stencil, such as perforated self-adhesive PVC or polyester films, can simply be pulled away from the substrate.

Alternatively, the stencil may be an ink or other marking material that has a relatively low bond to the substrate. The required design is applied with inks or other marking materials that have a relatively good bond to the substrate. The stencil and the ink above it can be removed by abrasion, self-adhesive film application and removal or other means to leave the stencil area clear and transparent but the required colors superimposed in the required silhouette pattern and design. Also the adhesive may be one which leaves a residue after removal so that the product can be secured to another surface.

As one example, the required stencil pattern can be printed on acrylic sheet with an organic solvent based printing ink. When dry, the design can be screen printed "blocking out" the required areas in successive layers, using a PVC ink. The required silhouette pattern is then produced by removing the stencil and the ink adhered to it by the application and subsequent removal of self-adhesive film by any of the techniques described in method 3.

The stencil may be of a material that is very expansive under certain conditions, so that the ink or other marking material above the stencil is ruptured and separated from the ink adhered directly to the substrate. Any residue of the stencil and superimposed ink can then be removed by abrasion, solvent or other means, leaving the stencil area clear and transparent. As one example, the stencil can be a water expansive photo-stencil and the inks can be any water permeable ink. As another example, the stencil can be a thermal expansive ink which expands when the temperature is raised.

The stencil may be of any ink repellent nature, for example, a wax that is repellent to water based inks and which can subsequently be removed by melting, abrasion, water hosing, solvent, or combination therof after the ink or marking materials have been applied.

The stencil may be compressible and/or may not allow the ink to cure properly or may degrade by UV or other radiation applied through the substrate, such that under abrasion or high pressure hosing, both the stencil and inks or other marking materials above it are removed, leaving the required colors superimposed in the required silhouette pattern and design.

The stencil can be of a material that has a solvent to which the inks or other marking materials are resistant. The inks or other marking materials may be printed slightly oversize to cover the gaps between the stencil but leave sufficient area of the stencil exposed to enable the stencil to be removed by solvent, thus achieving exact registration of required colors superimposed in the required silhouette pattern and design. The stencil may be an acid etch resist ink which could be removed by a dilute alkali solvent such as sodium carbonate or caustic soda.

5. A "resist" techique in which the silhouette pattern is printed either as part of or over the required design, which is printed "blocked out" in successive layers. The areas of the lower levels of ink, required to be transparent, are etched away by a solvent which does not affect the "resist" elements.

If a single color is required on one side of the silhouette pattern the "resist" may be in that color, applied over the colors forming the required design on the other side of the silhouette pattern. Alternatively or otherwise the "resist" can be transparent to avoid the need to subsequently remove it and to overcome the problem of registration of a fine silhouette pattern being applied in more than one stage. Alternatively, the "resist" can be a material that is subsequently removed by solvent or other technique, in which case it can be any color.

As one example, the base material can be acrylic sheeting. The colors of the design can be "blocked out" with an acid etch resist ink. The silhouette pattern and the design can then be printed in clear ink not soluble in alkali. Unwanted ink between the elements of the silhouette pattern and the design can then be removed by etching with a dilute alkali such as sodium carbonate or caustic soda.

As another example, the colors of the silhouette pattern and the design can be "blocked out" with virtually any ink suited to the base material. The silhouette pattern can then be applied by a water dispersible photoresist technique. The unwanted ink can then be etched with a non-aqueous solvent of the ink, as long as it does not attack the base material. The resist can then be dispersed by the application of water.

6. The silhouette pattern can be recessed into the surface of the base material. This allows the required pattern colors to be applied in "blocked out" areas, for instance by spraying ink through stencils on the surface, as appropriate. The areas between elements of the silhouette pattern which are required to be transparent, can be cleaned off between applications of ink or after all ink has been applied or these areas can be protected during the application of ink by a stencil of the silhouette pattern. After the application of the required colors, the stencil is removed together with the unwanted ink over it by any of the methods outlined in method 4.

The recessed silhouette pattern and design may be formed by casting, for example into acrylic sheet material, by engraving, milling, drilling, [san] *sand* blasting, laser etching, chemical etching, hot foil transfer or other [technique] *technique*.

7. The silhouette pattern can be made by mechanical removal of inks or other marking materials after application of the required design and colors in "blocked out" areas. As one example, clear lines of uniform or varying width could be erased by abrasive wheels to leave a lined or tartan-like silhouette pattern and design.

8. The silhouette pattern and design may be formed by a cut film, normally applied from a carrier layer to a sheet substrate by self adhesive. The required pattern and design may be printed "blocked out" on the film or may comprise a laminate of cut layers to produce a similar effect, prior to die cutting and removal of the areas required to be transparent. The film material can be reeled and can be cut and the unwanted areas removed mechanically, reel to reel, normally with a silhouette pattern of continuous straight or curved lines. Alternatively, suitable grades of sheet or film material can be punched, burnt, laser cut or otherwise cut normally to achieve a perforated membrane of a grid, net or filigree type of silhouette pattern, the holes of whatever shape forming the transparent areas. The holes may be formed after printing or otherwise applying the required design "blocked out" or the required design may be produced after the holes have been formed, for example, by spraying using appropriate stencils or masking to control the areas of application. Such patterned perforated sheets or membranes may then be formed within, attached to, or be independent of the transparent sheet or film materials.

In any of the above methods, the term "blocked out" is intended to include the overall application of a multicolor printing process, for example of 4 or 5 colors, to achieve almost limitless combinations of perceived color in a design. The various techniques will only retain deposits of color within the required silhouette pattern and design in the finished product.

Any of the techniques for producing the required designs and silhouette pattern can be applied to translucent or obscure sheets or film or, instead, a lacquer or film can be applied to a panel of the invention to achieve a translucent or obscure effect, while the silhouette pattern and the design or designs remain visible in the finished product.

It may be advantageous to protect the pattern on one or both sides of a panel and suitable methods and examples of suitable assemblies are as follows:

(i) The pattern and design can be encapsulated within a plastic sheet during the casting or other production process of the panel. The [sheet] *pattern and design* can be coincident with a surface of the panel or intermediate the panel surfaces.

(ii) The pattern and design may be disposed within two or more sheets of transparent material normally held or laminated together by any technique. For example, the sheets may be laminated with resin or PVB film with or without barrier layers to prevent chemical attack and/or to promote bonding. Two or more sheets sealed around their edges can be held together by a vacuum. The elements of the silhouette pattern, such as printed dots, can form spacers to provide a continous vacuumed space between the sheets.

(iii) The pattern and design may be disposed between a thin film laminated to a panel, the pattern being independent of the film or panel or applied to either the film or the panel.

(iv) The pattern and design may be disposed within a glazing assembly of two or more layers, for example, it may be printed onto the inside of one of the layers of a double glazing assembly or onto a sheet or film within a double glazing assembly, which sheet or film may be independent of or attached to one or more parts of the double glazing assembly.

In situations where it would be difficult or less economical to apply the opaque pattern and design in large areas, smaller areas or "tiles", having suitably accurate edges or a suitably patterned perimeter, can be joined together to provide the required staisfactory impression overall. Such "tiles" may be of any suitable design but in a particular application each tile may have an individual letter or numerical character thereon so that unique messages, advertisements, etc. can be built up. The "tiles" may be attached to a transparent base, for example, by static cling film or by adhesive, and may have a protective cover layer. The tiles may be included in a laminate or like assembly, such as within a double glazing assembly.

The silhouette pattern can be a single color on both sides over part of a panel and different colors on different sides over the remainder of the panel. The design on one or either side of silhouette pattern can be such that any single element of the silhouette pattern can have two or more colored areas within it. One or more parts of a panel can be left clear of a silhouette pattern. The opaque elements of a silhouette pattern which are colored differently on each side to provide a different design when viewed from different sides of the panel, need not form a continuous pattern but may be one or more individual elements or any shape, at any spacing in relation to other elements.

The transparent base material to which the invention can be applied can be a sheet or a film or other transparent material and can be "water clear" or stained or otherwise tinted. For example, the invention can be applied to transparent polyester film such as "Melinex" produced by ICI PLC. The film can be unsupported, be stretched within a frame, hung suitably weighted, or adhered to a transparent sheet material. For example, a strip of static cling PVC film or self-adhesive PVC film can be attached to the upper part of a car windshield. On the inside of the car, the film may have a single color pattern, which may be graded for varying solar glare protection, but on the outside a design may be incorporated, for example, the name of the owner of the vehicle.

A transparent sheet or film in accordance with the invention having the differential designs applied at one surface can be silvered or otherwise made reflective on the other side or a stationary or movable mirror surface can be disposed at a distance from the other side. By this means, both designs can be seen from one side only by the viewer appropriately positioning himself so as to receive the reflected image of the other design which would not normally be visible from the one side. By alternately illuminating either side of the silhouette pattern, the perceived images will alternate. If the mirrored surface is moved, the rear image will appear to move.

The opaque silhouette pattern may have another useful purpose, for example, it may comprise or be comprised in, a heating element within or attached to a vehicle [windshield] *window*, a building window, screen or partition. The heating element may be of a design that has the required optical effect and may be differently colored on each side and have colored designs on one or both sides. Similarly, a security grill, a reinforcing mesh, a security alarm tape, radio or television aerials, elements of a solar powered cell or other elements within or adjacent to a transparent assembly may be formed to act as the silhouette pattern and be suitably colored on one or both sides according to the invention.

In certain embodiments of the invention in which a one-way vision effect is desired, the invention has advantages over known alternatives such as partially metalized transparent materials, sometimes referred to as one-way mirrors, apart from the advantage of being able to incorporate a multi-colored design such as an advertisement into the assembly. For example, on a commercial vehicle, a rear window could incorporate the invention thereby providing a one-way vision effect, that is to say it is possible to see out from within the vehicle but, under normal circumstances, not possible to see into the vehicle from the outside. At the same time, a design on the outside of the window can be in the form of an advertisement, for example the name of the company or product and will be visible to other road users or pedestrians. However, if the police or other security forces wish to see inside the vehicle, this is possible at close quarters, unlike one-way mirrors, which are disliked as vehicle windows by the police, for this reason.

The design image perceived and its intensity, and the visibility through a panel of the invention depend upon a number of factors including the lighting conditions on either side of the panel, the light transmittance and surface reflectivity of the transparent material, the reflectivity and contrast of the colors used in the silhouette pattern or superimposed design, the distinctiveness of the design, the proportion of opaque to transparent areas and the shape of the silhouette pattern. Typical daylight conditions will normally be adequate to render a design clearly visible from the outside of a building or vehicle, if the design is incorporated into a window assembly or is located near to it. In internal situations, artificial lighting may be arranged to enhance the required images, for example by directing spotlighting onto the appropriate surface or surfaces. Perceived images are generally brighter if they are viewed from a reflecting angle to the light source. For example, an image of a design on an upper story window of a building will appear brighter when viewed from the ground, because of light reflected from the sky, than the image of the same design on a ground floor window which reflects less of the sunlight. An image on a sloping window on a vehicle will be brighter than on a vertical window.

Conditions can be such as to allow the eye to see the design or to see through the design beyond the patterned transparent material, depending inter alia upon the focus of attention of the viewing person, and upon the proximity of the viewing person to the panel, as well as the other factors listed above as affecting the perception of design image. For instance, if a design such as a sign according to the invention is incorporated upon a transparent door, it can be possible to read the sign but still be aware of images beyond the door, such as an approaching person. Thus the invention can provide a safety feature by identifying potentially dangerous areas of glass without masking the view beyond the glass and can bear a design or message without preventing visibility of a potential hazard beyond.

By altering the illumination on either side of a panel, the eye's perception of the panel and the space beyond can be changed. If the illumination is altered from relative light on one side and relative dark on the other side to relative light on the other side and relative dark on the one side, the eye's perception will change when looking from either side of a suitably patterned and designed panel. Looking from the one side the principal perceived image will change from the design on the one side to the space on the other side. Looking from the other side the principal perceived image will change from the space on the one side to the design on the other side. As well as providing an eye catching alternating display, for example, within a shop, this effect can have safety and other practical applications, for example, a panel giving a written warning of danger, while the alternating transparency allows that danger behind the panel to be visible.

By incorporating different colors within a design or designs and illuminating with different colored alternating light sources, an impression of moving images in one plane or between planes of an assembly can be achieved. Some parts of a design may only be visible under certain types of light sources. For example an ultra violet sensitive dye may be incorporated into a white ink to create a pattern which is visible under ultra violet lighting conditions but is not visible under other lighting conditions, and is indistinguishable from normal white ink background.

A changing image can also be achieved by a movable embodiment of the invention, for example a rotating sign which may be plane or multi-faceted. By illuminating the sign relatively intensely from one direction, two or more different images can be perceived from the well illuminated direction, while the sign will appear transparent when viewed from the other direction.

When a panel of the invention is used to enclose or partially enclose a light source, for example, a lampshade having a design on the exterior, the appearance of the design on the shade will change when the light is turned on or off. When the light is off, external light will illuminate the design on the outside of the shade. When the light is switched on, the light transmitted through the shade will exceed light reflected from the exterior of the shade and the design on the outside of the shade will not be readily perceived. If there is a design on the inside of the shade, it will be seen when the light in on but not readily perceived when the light is off. This effect is of great practical value in enclosed illuminated signs, enabling a point light source to be used rather than an array of [liht] *light* sources to achieve near uniform backlit illumination, as in a conventional sign box, and enabling the indicia to be invisible in ambient lighting or a different sign to be visible in ambient lighting.

Light gathering materials, such as the "LISA" product manufactured by Bayer can be used to enhance the perceived designs. For instance, a suitably patterned light-gathering sheet or film in a window enables one design to be visible outside the building and enhance a different image visible inside the building by means of the light that is received solely or primarily from the outside being internally reflected until scattered by the inside design located on the outside surface of the sheet or film and emitted through the inside surface. The silhouette pattern may be printed or recessed by etching, milling, casting or other means or punched, drilled or otherwise cut into the material. In one embodiment, a silhouette pattern is printed or otherwise incorporated on transparent material. A light gathering material is punched or otherwise worked to produce recesses, holes or torn edges of the light gathering material which glow more visibly than the remaining areas. The worked pattern may correspond in whole or in part to the silhouette pattern on the transparent material when they are aligned together, so that a design such as a sign is clearly visible from one side but is masked by the silhouette pattern from the other side. Lighting can be arranged to allow vision through the panel from one or both sides of such as assembly. Ultra violet light will further enhance the visibility of designs incorporated on or within light gathering materials.

Edge lighting of products of the invention may also be used to enhance the images perceived on one or both sides of an assembly. The light can be introduced through one or more edges of a transparent material and is internally reflected until scattered by the inside design [of] *on* the silhouette pattern on one surface and emitted through another surface, making the pattern more visible. Light gathering or edge lit products may be placed back-to-back with the silhouette pattern normally in registration and, if desired, with an intermediate opaque silhouette pattern on a separate transparent material, in order to achieve the desired effect, such as an illuminated sign that appears different from one side than from the other and, if desired, can be made transparent from one side or the other by appropriate relative fixed or changing lighting intensities.

Colored lights or images, such as those from photographic transparencies, can be projected onto the surface of the products of the invention preferably onto white or light areas on one side of the silhouette pattern, while maintaining visibility through the panel from the other side. This can be of use, for example, in theaters, TV or film studios or exhibitions.

The inks or other materials forming the opaque pattern may be luminescent, fluorescent, irridescent, phosphorescent, metallic, reflective or have other light enhancing or eye attracting properties, to intensify the perceived image, such enhancement being apparent under normal lighting conditions, special lighting conditions or excited by electrical current or other techniques. Elements of the pattern may be faceted, or located within or outside a panel or assembly to enhance visibility.

Elements of the pattern may themselves be light sources. For example, an array of small light bulbs may be disposed to be masked by a silhouette pattern and be on one or both sides of the silhouette pattern. An illuminated pattern may be seen on one side but not seen from the other side and/or be seen from the other side but not from the one side and either pattern may be varied by appropriate circuitry and switching. Visibility through the panel can be maintained from one or both sides, if required.

An array of fluorescent light tubes or other luminous materials, such as suitably illuminated light gathering tubes or rods, can also form an embodiment of the invention by suitably masking out unwanted areas of the design by, for example, paint or applied film material, normally black in color.

Figure 18:
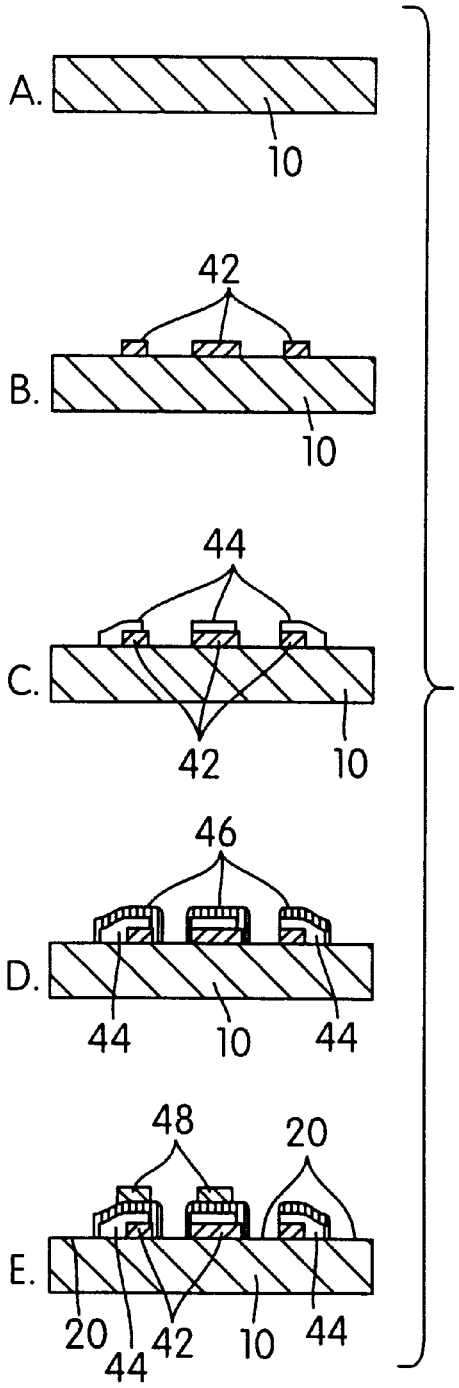

FIG. 18 illustrates steps in the method 1 of producing a differential design by overprinting. FIG. 18A shows a substrate 10. FIG. 18B shows a design 42 to be visible from one side printed onto the base 10. FIG. 18C shows a background color 44 to be seen from the one side, superimposed over the design 42. FIG. 18D shows a background color 46 to be seen from the other side of the finished panel, superimposed over background 44. FIG. 18E shows a design 48 to be visible from the other side, superimposed over 46. The designs 42 and 48 may be in more than one color, in one or more layers and in any position on the surface. It is normal for a black or dark background color 46 to overlap other colors to avoid the colors in design 42 being seen from the other side or the colors in design 48 being seen from the one side. Alternatively, an overlapping black layer may be placed intermediate the backgrounds 44 and 46 or between the designs 42 and 48 if there are no colored backgrounds. The silhouette pattern is defined by the extremities of the individual elements within or outside the transparent area or areas 20.

Figure 19:
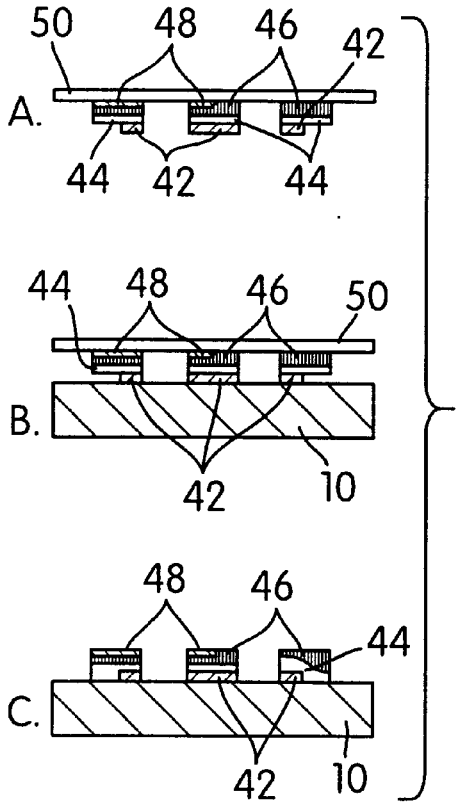

FIG. 19 illustrates method 2 of producing a differential design by transfer or decal. FIG. 19A shows a transfer or decal with a pattern and differential design printed by method 1 or any other method onto a carrying membrane 50. Reference numerals 42, 44, 46 and 48 indicate the same features as in FIG. [8] *18*. FIG. 19B shows the transfer adhered to substrate 10 by water slide, pressure sensitive adhesive or othe techniques. The carrying membrane 50 may be as shown or intermediate the pattern and designs and the base material 10. The carrying membrane 50 may be transparent and not be removed or may be pulled away, for example, as with a dry transfer technique or be otherwise removed or [being] *be* burnt away in a glass [toughness] *toughening* furnace, while the pattern and designs are retained on the surface of the substrate.

Figure 20:
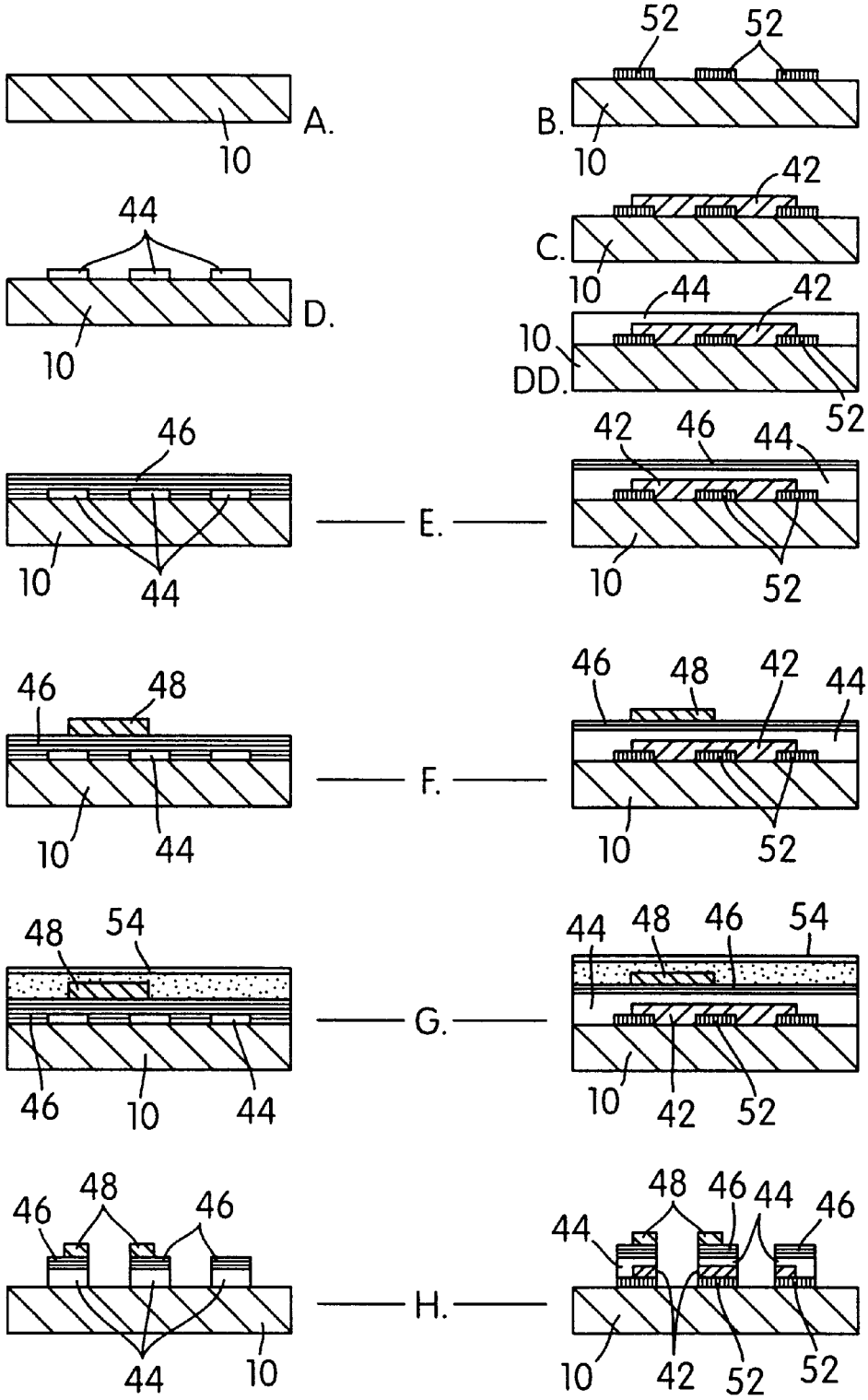

FIG. 20 illustrates method 3 of producing a differential design by first applying the silhouette pattern in one ink that adheres relatively well to the substrate 10. If the silhouette pattern is to be all one color on one side this is applied directly, shown by reference numeral 44 in FIG. 20D. If a design is required on the one side, the silhouette pattern is first applied in transparent ink 52 as shown in FIG. 20B. The design 42 on the one side is then printed "blocked out", on and between the silhouette pattern 52 over the required area. Background color 44 is then "blocked out" over the whole area as in FIG. 20DD.

The subsequent steps in the method are the same for the partially finished panel of FIG. 20D and FIG. 20DD. Thus, as shown in FIG. 20E, background color 46 is then "blocked out" over the whole area of the panel. In FIG. 20F, the design 48 to be visible from the other side is "blocked out" over the required area. In FIG. 20G, high tack self-adhesive film 54 is applied over the whole area. FIG. 20H shows the panel after the self-adhesive film has been pulled away, taking with it the ink applied over the area between the silhouette pattern printed in 20B or 20D, this ink adhering well to the ink forming the silhouette pattern but not to the substrate. Thus the desired silhouette pattern and designs are produced in exact registration.

Figure 21:
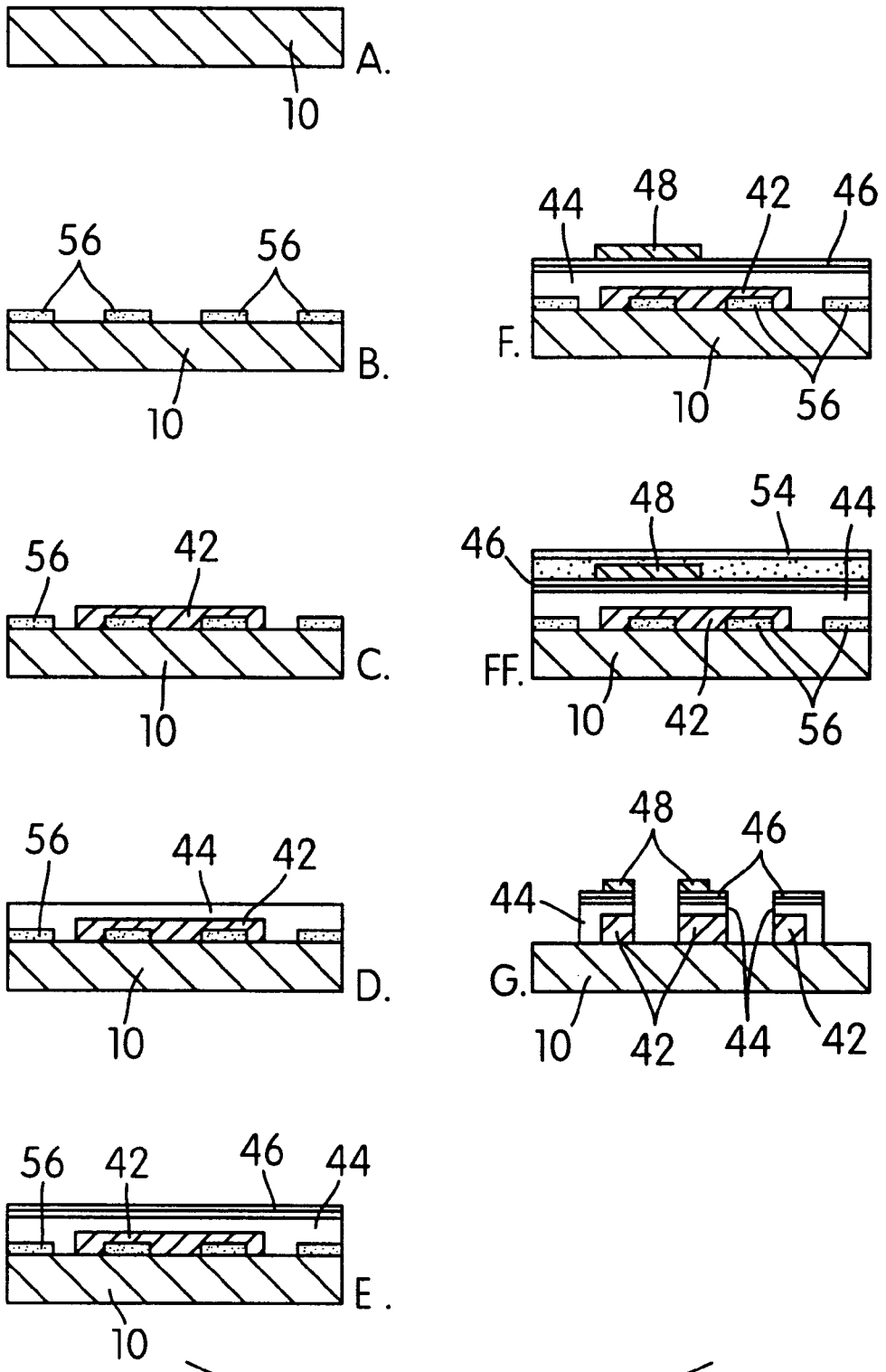

FIG. 21 illustrates method 4 of producing a differential design by first applying a stencil material 56 of the required silhouette pattern to the substrate 10, as in FIGS. 21A and 21B. In FIG. 21C, design 42, to be visible from the one side, is applied "blocked out" over the required area. In FIG. 21D, background color 44 is "blocked out" over the whole area. In FIG. 21E, background color 46 is "blocked out" over the whole area. In FIG. 21F, design 48, to be visible from the other side, is applied "blocked out" over the required area. In FIG. 21G, the stencil material 56 has been removed, leaving the desired silhouette pattern and designs in exact registration. An example of one technique of removing the stencil is shown in FIG. 21FF, which is the application of the self adhesive film 54 after stage 21F. The subsequent removal of the film 54 also removes the stencil material with it, since the stencil material has a poor bond to the substrate and also [since the ink is] *the inks* lying above the stencil.

Figure 22:
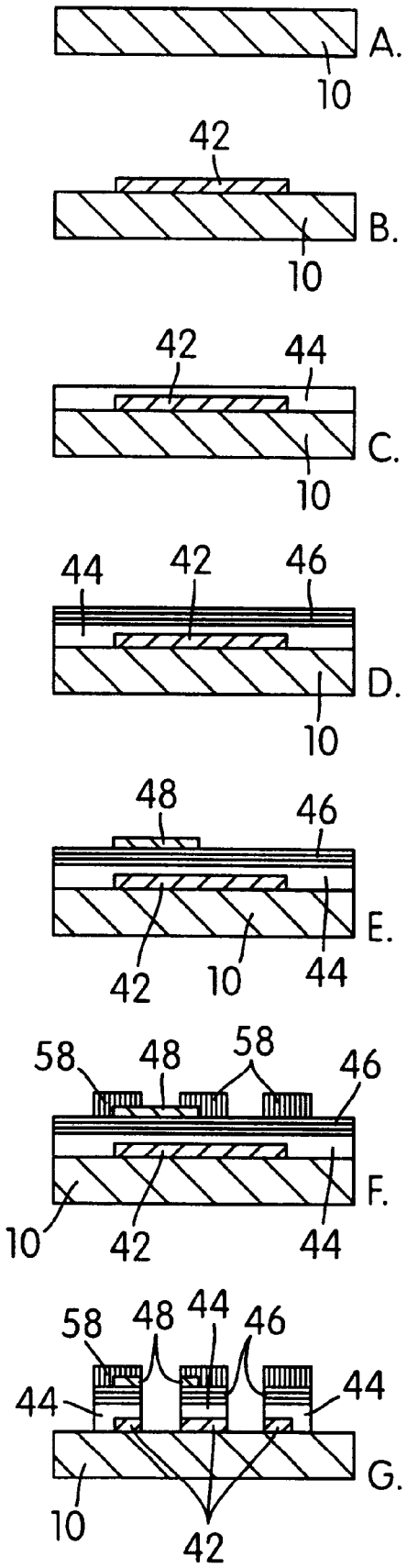

FIG. 22 illustrates method 5 of producing a differential design by a "resist" technique. FIG. 22A shows a substrate to which design 42, to be visible from one side is applied "blocked out" over the required area, as shown in FIG. 22B. In FIG. 22C, background color 44 is "blocked out" over the whole area. In FIG. 22D, background color 46 is "blocked out" over the whole area. In FIG. 22E, design 48, to be visible from the other side, is applied "blocked out" over the required area. In FIG. 22F, transparent ink or other material 58 is applied in the silhouette pattern. In FIG. 22G, a solvent to inks 42, 44, 46 and 48 has been applied, to which the material 58 is resistant, etching away the unwanted ink and leaving the desired silhouette pattern and designs in exact registration.

Figure 23:
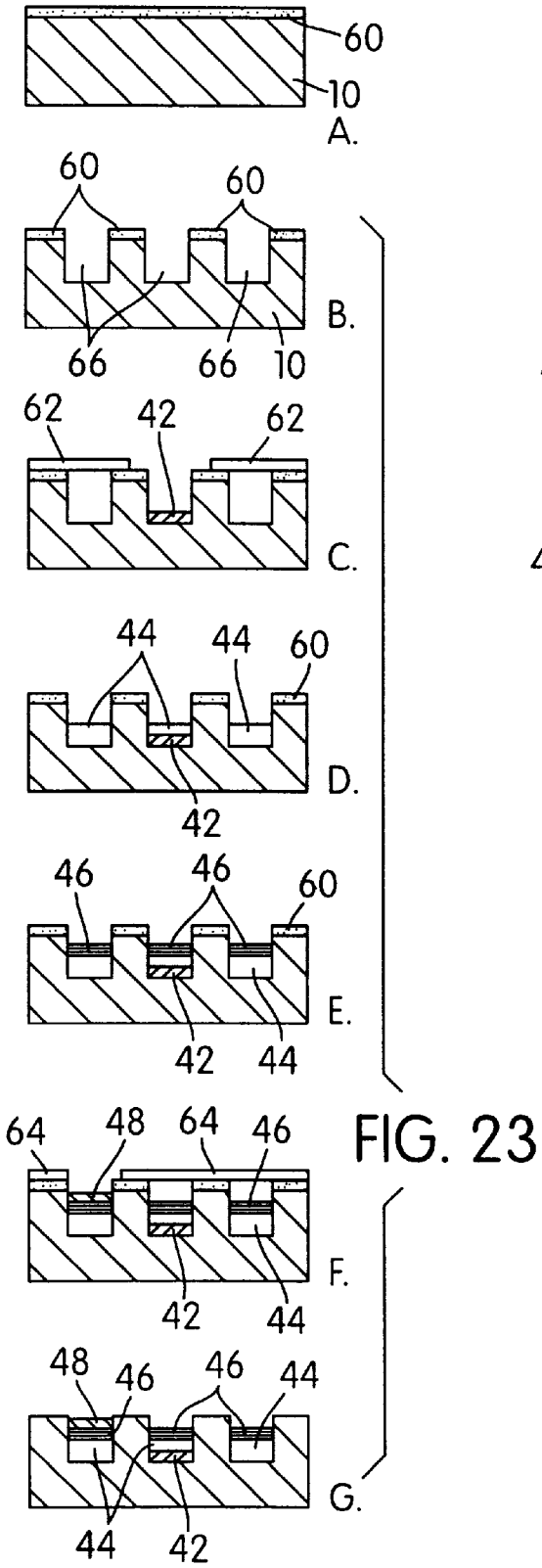

FIG. 23 illustrates method 6 of producing a differential design by recessing the silhouette pattern into the surface of the base material. FIG. 23A shows a base material 10 with an optional protective material 60, such as self-adhesive film, placed over it. In FIG. 23B, recesses 66 have been formed for the silhouette pattern, for example, by laser etching. In FIG. 23C, a stencil 62 is positioned to enable the required design 42 on one side to sprayed into the recessed silhouette pattern. Waste ink is removed from protective film 60 after this and subsequent ink applications. In FIGS. 23D and 23E, background colors 44 and 46 are sprayed over the whole area. In FIG. 23F, a stencil 64 is positioned to enable the required design 48 on the other side to be sprayed over the required area. In FIG. 23G, the protective film 60 has been removed, leaving the required design within the required recessed silhouette pattern.

Figure 24:
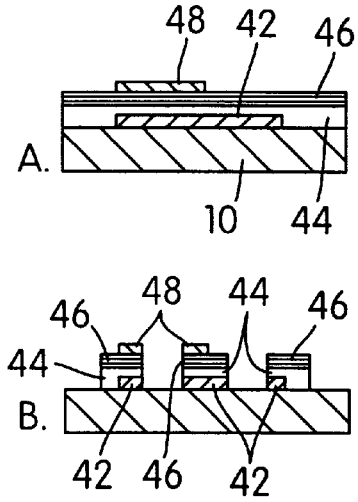

FIG. 24 illustrates method 7 of producing a differential design by mechanical removal of inks or other materials. FIG. 24A is achieved in the same way as in method 5 illustrated in FIGS. 22A–E. In FIG. 24B the areas required to be transparent have been cut, abraded or otherwise cleared away, leaving the required silhouette pattern and designs with exact registration.

Figure 25:
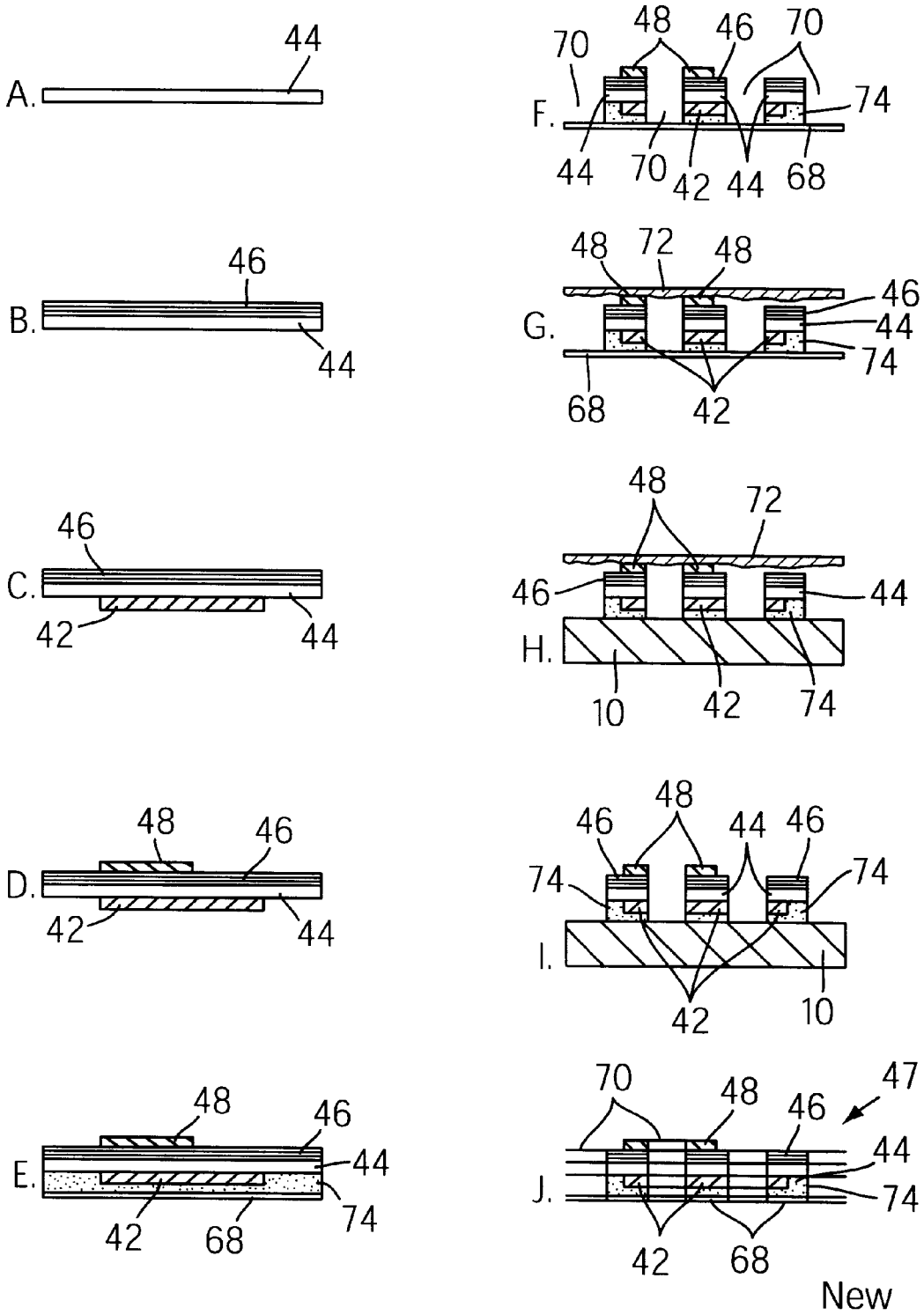

FIG. 25 illustrates said method 8 of producing a differential design by die cut film. Die cut film materials are in common usage in graphic displays, normally having self-adhesive PVC indicia. FIG. 25A shows a piece of film 44. FIG. 25B shows the film 44 printed or sprayed with a different color 46 or a separate film 46 laminated thereto. FIGS. 25C and 25D show the required designs 42 and 48 applied by printing, spraying through stencils, die cut film laminating or other method. In FIG. 25E, a protective film 68 is applied with clear adhesive 74 to one side of the assembly. In FIG. 25F, the areas 70 which are required to be transparent have been die or [real] *reel* cut and [striped] *stripped* away. *Alternatively, as illustrated in FIG. 25J, suitable grades of sheet or film material can be punched, burnt, laser cut or otherwise cut normally to achieve a perforated membrane 47 or a grid, net or filigree type of silhouette pattern, the holes 70 of whatever shape forming the transparent areas. The holes 70 may be formed after printing or otherwise applying the required design "blocked out" or the required design may be produced after the holes have been formed, for example, by spraying using appropriate stencils or masking to control the areas of application. Such patterned perforated sheets or membranes 47 may then be formed within, attached to, or be independent of the transparent sheet of film materials.* FIG. 25G shows a self-adhesive carrying membrane 72 applied to the other side. FIG. 25H shows the protective film 68 having been removed and the product applied firmly to the base material 10. In FIG. 25I the carrying membrane is removed leaving the required silhouette pattern and designs with exact registration. If design 42 were not required, the protective film 68 and adhesive 74 would normally be adhered to film 44 prior to printing, in the manner of manufactured products for die cutting indicia for self-adhesive application.

FIGS. 26/1 to 26/7 represent several different examples of the invention which have fundamentally different vision characteristics. In each figure, 2 represents a panel of the invention, 4 represents a line of attempted vision through the panel 2, 8 is an object beyond the panel, and 6 represents vision of a design visible on the panel.

In FIG. 26/1, the design 6 can be seen by an observer on the left hand side who can also see the object 8 through the panel. An observer on the right hand side can see through the panel and does not see the design.

In FIG. 26/2, an observer on the left hand side of the panel sees the design but cannot see throught the panel. An observer on the right hand side can see through the panel.

In FIG. 26/3, an observer on the left hand side sees the design and can see through the panel while an observer on the right hand side cannot see through the panel.

In FIG. 26/4, there is no vision through the panel from the left side or the right side but the design can be seen from the left side.

FIG. 26/5 represents a panel with a design on both sides. From the left side the design 6 can be seen and there is vision through the panel. From the right side design 6' can be seen and there is vision through the panel.

In FIG. 26/6, there is no vision through the panel from the left side or from the right side but the design 6 can be seen from the left side and the design 6' can be seen from the right side.

In FIG. 26/7, the design 6 can be seen from the left side but there is no vision through the panel. From the right side the design 6' can be seen and there is vision through the panel.

FIG. 27 illustrates one side of a panel in which dark dots or parts of dots represent the design, the white colored dots or parts of dots represent the background to the design formed by the silhouette pattern and the grey area between the dots represents the transparent area of the panel.

FIG. 28 illustrates one side of a panel without a design, the dark dots representing the silhouette pattern, the remaining area being transparent or translucent.

FIG. 29A represents a planar view of a panel 94 of the invention with an object 86 on side 90 of the panel and an object 88 on side 92 of the panel.

FIG. 29B represents a perspective view from side 92, the object 88 and the side 92 of the panel being visible, having a design 80 of dark dots on a background of white dots 82, obstructing vision of object 86.

FIG. 29C represents a perspective view from side 90, both objects 86 and 88 being visible, the latter through black dots 84.

FIG. 30 shows one side of a panel of the invention with a different design to that of FIG. 27 in grey dots, or parts of dots, and a background of black dots or parts of dots. The white area between the dots represent the transparent or translucent area of the panel.

FIG. 31A is a planar view of a panel 100 of the invention with an object 86 on one side 98 of the panel and an object 88 on one side 92 of the panel.

FIG. 31B represents a perspective view from side 92, the object 88 and the side 92 of the panel being visible, having a design 80 of dark dots on a background of white dots 82, obstructing vision of the object 86.

FIG. 31C represents a perspective view from side 98, object 86 being visible on side 98, design 96 in grey dots being visible and object 88 being visible through background black dots 84 but obstructed by the design 96.

FIG. 32 shows diagrammatically 36 distinctly different vision control effects achievable by the invention. In each diagram, 2 represents a panel of the invention, 4 represents attempted vision through a panel 2, 8 represents an object visible beyond the panel, otherwise vision through the panel is obstructed and terminated by panel 2. The dashed lines indicate alternative vision that can be optionally concentrated upon the design 6 [pattern] or the panel or can be concentrated on the object 8 at the will of the viewer. 6 represents vision of a design on the left hand of the panel and 6' represents vision of a different design on the right hand side of the panel.

FIGS. 32/1-7/1 illustrate the same effects as FIGS. 26/1-7. FIGS. 32/1-7/2, 3 and 4 are panels similar in arrangement to the panels in FIGS. 32/1-7/1 with the same second figure numeral but have silhouette patterns and designs to enable alternative vision in the indicated directions. FIGS. 32/1-7/1, 2, 3 and 4, therefore, represent 24 distinctly different panel types of the invention. FIGS. 32/1-7/5 and 6 do not represent different panel types of the invention but different lighting conditions applied to panels in FIGS. 32/1-7/1, 2, 3 or 4 with the same second figure numeral, which thus have convertible vision control effects. FIGS. 32/1-7/5 have a much greater illumination on the right than the left side and FIGS. 32/3-7/6 have a such greater illumination on the left than the right side.

The products of the invention have a wide variety of uses. A principal application is in circumstances where a design, such as information, an advertisement or other indicia is to be visible from one side of a panel and not visible from the other side, this being coupled, if desired, with one-way vision. Instances where products of this kind are useful include privacy glazing for buildings such as domestic housing, public buildings, commercial buildings, temporary buildings, for caravans and vehicles, for ships, yachts, etc. Privacy glazing bearing a multi-colored design is generally more effective than that of a single color; the eye is attracted by and concentrates upon the design, as well as just the reflected light, further obscuring vision beyond. The disadvantages of net curtains, such as their cleaning, folds, seams and difficulty of incorporating multi-colored designs thereon and other limitations of filigree designs, are overcome. The products can also be used for security glazing where one-way vision is important, in banks, for transparent doors, and decorative panels, for example for showers and for film and television studio sets. The invention can also be used in connection with sports equipment, for example, as basketball backboards, as transparent barriers or fences surrounding indoor soccer fields, ice skating rinks or cricket fields. The invention can also be used to prevent or limit the fans from vandalizing the field and harassing the players, for example, by replacing soccer goal netting with the invention and/or providing additional screens to protect the goalkeeper from objects thrown onto the field. Other instances where one-way vision may be required and where the invention can be used include operating theaters in teaching hospitals and screens and hidden enclosures for observing animals.

The invention may also be used for transparent containers, for example, for medicines or other substances where it is desirable that printed characters of the descriptive matter are not confused with the characters on the opposite side of the container.

There are many specific situations where it is advantageous to provide a design on one side of a transparent panel which is not seen from the other side. For example, in a shop window, the name of the retailer can be incorporated so as to be visible on the outside of the glass window but from the inside a uniform toned-down image can be provided through the glass, looking towards the outside, avoiding the unfortunate effect of a "mirror image" of the design being displayed on the inside. On the inside of the glazing, the silhouette pattern, for example, of black or dark colored dots, is visible upon close inspection but not noticeable from a distance, except for giving a toned down image. On the outside, the design can be defined by differentially colored areas of the same opaque pattern having exact registration with the pattern on the inside. For example, on the outside of the panel the dots [an] *can* be generally white but within the design of letters or other indicia the dots may be blue, whereas on the inside all the dots are black.

In another embodiment, the design is provided on the darker side of such a panel, for example[, and] *an* "exit" sign onto the inside of a panel in an external door. The panel will provide a one-way effect for privacy purposes, to limit the visibility to the inside of those on the outside. In this instance, the pattern, for example of dots, on the outside, daylit side of the door may be white or light colored and the pattern of dots on the inside of the door may be black or dark colored, except that the part of the pattern included in the word "exit" would be in a distinctive color by appropriately coloring the individual dots or portions of dots.

There are many specific situations where it is advantageous to provide different indicia or other designs on either side of a panel. For example, on a transparent glass door a "push" sign can be incorporated on one side of a door and a "pull" sign incorporated on the other side of the door in the same or a different position, neither sign being visible from the opposite side, while maintaining transparency through the door over the area covered by the signs.

There are many situations where advertisements are enabled by the invention, which would otherwise be inappropriate. For example, advertisements may be incorporated on a transparent panel of a bus stop facing oncoming traffic, the most effective side for advertising, while maintaining visibility through the advertisement for those awaiting a bus. As another example, advertisements can be incorporated on underground train windows, facing inwards and outwards. Advertisements facing inwards would be seen by passengers when travelling inside a dark tunnel or during the hours of darkness, while vision through the panel would be enabled at relatively well illuminated underground stations or in daylight, which would also enable those outside the train to see advertisements facing outwards, coupled with some perception of the inside of the train.

Applications of the invention in which one way vision is not required, include, for instance, some transparent partitions for buildings such as offices. However, the invention allows new decor concepts. For example, one design and color scheme can be continuous along a corrider, while the individual rooms or offices off such a corridor can have their own different individual design and/or color schemes.

Another application is in spectacles, visors and the like, which can bear a design but be clearly seen through, for example as in novelty sunglasses.

The preceding description of the invention is illustrative only and changes may be made by one of ordinary skill in the art, particularly with regard to matters of shape, size and arrangement of parts, within the scope of the invention, as interpreted by the broad general meaning of the terms in which the following claims are expressed.

I claim:

1. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, said sheet of light permeable material being substantially imperforate, said design and said silhouette pattern being adhered to one another throughout an area of said design, and at least one of said design and said silhouette pattern being adhered to said sheet of imperforate light permeable material throughout said silhouette pattern, *and*

*wherein a principle perceived image when viewing said panel changes from said design to* an object *occupying*

*a space on said other side when the illumination is altered from relative light on the one side and relative dark on the other side relative light on the other side and relative dark on the one side.*

2. A panel [as claimed in claim 1 further] comprising:

*a sheet of light permeable material, and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases; and* a second design visible from said other side of the panel and not visible from said one side of the panel, said design and said second design being superimposed on or forming a part of said silhouette pattern.

3. A panel as claimed in claim 1 wherein clarity of vision is provided from the one side to the other side of the panel through the area covered by said silhouette pattern without said design and not through the area covered by said silhouette pattern with said design; and wherein clarity of vision is provided through the panel from the other side to the one side, the non-patterned areas permitting any desired amount of light transmission.

4. A panel [as claimed in claim 1,] *comprising:*

*a sheet of light permeable material; and a design formed on said sheet, said design visible from one side of the panel and not visible from the other side of the panel, said design being superimposed on or forming a part of a silhouette pattern; and* wherein visibility from one side to the other side is totally *or partially* obstructed over the area covered by said silhouette pattern and said design;

and clarity of vision is provided through the panel from the other side to the one side*; and*

*wherein said design is decreasingly perceptible from said one side of the panel from which said design is normally visible as the level of illumination perceived through the panel from the level of illumination of the space on the other side increases,* said sheet of light permeable material being substantially imperforate, said design and said silhouette pattern being adhered to one another throughout an area of said design, and at least one of said design and said silhouette pattern being adhered to said sheet of imperforate light permeable material throughout said silhouette pattern*; and*

*when the illumination is altered from relative light on the one side and relative dark on the other side to relative light on the other side and relative dark on the one side, the principal perceived image changes from said design to an object occupying the space on said other side.*

5. A panel as claimed in claim 1, wherein said light permeable material is transparent, and wherein clarity of vision is provided from the one side to the other side of the panel through the area covered by the silhouette pattern and not through the area covered by the design; and visibility from the other side to the one side is totally or partially obstructed, the non-patterned areas permitting any desired amount [[desired]] light transmission.

6. A panel as claimed in claim 1, wherein said light permeable material is transparent, and wherein clarity of vision through the panel from either side is totally or partially obstructed over the area covered by the silhouette pattern, the non-patterned areas permitting any desired amount [[desired]] of light transmission.

7. A panel as claimed in claim 2, wherein clarity of vision is provided from the one side to the other side of the panel through the area covered by the silhouette pattern and not through the area covered by said design; and clarity of vision is provided from the other side to the one side of the panel through the area covered by the silhouette pattern and not through the area covered by said second design.

8. A panel as claimed in claim 2, wherein clarity of vision through the panel from either side of the panel is totally or partially obstructed over the area covered by the silhouette pattern.

9. A panel as claimed in claim 2, wherein visibility through the panel from one side to the other side is totally or partially obstructed over the area covered by the silhouette pattern; and clarity of vision is provided from the other side to the one side of the panel over the area covered by the silhouette pattern but not through the area covered by the second design.

10. A panel as claimed in claim 2, wherein means is provided for reflecting the design on the other side so that said design and said second design can be seen from the one side.

11. A panel as claimed in claim 1, wherein the light permeable material is colorless.

12. A panel as claimed in claim 1, wherein said design and/or said silhouette pattern is substantially imperceptible from the side of the panel from which said design and/or said silhouette pattern is normally visible when the level of illumination transmitted through the panel from the other side of the panel substantially exceeds the light reflected from the side of the panel from which said design and/or said silhouette pattern is normally visible.

13. A panel as claimed in claim 1, wherein the design is arranged such that an observer can selectively see the design or see through the panel in the area covered by the design.

14. A panel [[as claimed in claim 1,]] comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

wherein the silhouette pattern comprises a plurality of *discrete* opaque areas*; and* wherein at least one of said *discrete* opaque areas has more than one color on at least one side thereof.

15. [A panel as claimed in claim 1, wherein the] *An assembly comprising:*

*a perforated material presenting a silhouette pattern, wherein a* design is [only applied to] *superimposed on or forms part of* the silhouette pattern;

*a perforated protective film; and*

*a perforated self-adhesive layer disposed between said perforated material and said perforated protective film so that said self-adhesive layer adheres said perforated material to said perforated protective film, said perforated material being removable from said perforated protective film so that said perforated material can be adhesively attached to a sheet of light permeable material;*

*said perforated material and said sheet of light permeable material constituting a panel after said attachment, said panel enabling said design to be visible from one side of the panel and not visible from the other side of the panel, and wherein said design is decreasingly perceptible from the side of the panel from which said design is normally visible as the level of illumination through the panel from the other side increases.*

16. A panel as claimed in claim 1, wherein said light permeable material is transparent and colorless, wherein the silhouette pattern is directly applied to the panel, and wherein said silhouette pattern is printed directly onto said light permeable material.

17. A panel [as claimed in claim 1,] *comprising:*

*a sheet of light permeable material; and a design formed on said sheet, said design visible from one side of the panel and not visible from the other side of the panel, said design being superimposed on or forming* [[apart]] a part *of a silhouette pattern; and* wherein [a] *said* design is located in a layer intermediate the silhouette pattern [the panel] and *said light permeable material and said design is applied directly to and facing in the direction of said light permeable material; and wherein said design is decreasingly perceptible from the side of the panel from which said design is normally visible as the level of illumination through the panel from the other side increases.*

18. A panel [[as claimed in claim 1,]] comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side relative light on the other side and relative dark on the one side;

wherein said light permeable material is transparent and colorless, wherein at least part of said silhouette pattern is a different color on at least one side thereof, and wherein said silhouette pattern comprises:

(i) a layer of one color printed directly onto said light permeable material, and

(ii) another layer of said different color printed onto said layer of one color, and a design printed onto said another layer of said different color.

19. A glazing assembling comprising:

a first panel of light permeable material;

a second panel of light permeable material;

at least one design formed on said first panel, said design visible from one side of said first panel and not visible from the other side of said first panel, said design being superimposed on or forming a part of a silhouette pattern and wherein said design is decreasingly perceptible from the one side of the first panel as the level of illumination through the panel from the other side of the first panel increases; and at least one second design formed on said second panel, said second design visible from one side of said second panel and not visible from the other side of said second panel, said second design being superimposed on or forming a part of said silhouette pattern and wherein said second design is decreasingly perceptible from the one side of the second panel and the level of illumination through the panel from the other side of the second panel increases.

20. An assembly as claimed in claim 19, wherein said first panel and said second panel are relatively movable.

21. A method of making a panel as claimed in claim 1, *which* [has] *panel comprises* at least one sheet *of said light permeable material*, and a design formed on said *as least one* sheet [which is], *said design being* visible from one side of the panel and not *visible* from the other *side of said panel, said method* including the steps of:

printing a silhouette pattern of [discreet] *discrete* print elements on the panel; and printing a design of [discreet] *discrete* print elements on the panel, the location of the [discreet] *discrete* elements of said design corresponding to the location of at least some of the [discreet] *discrete* elements of said silhouette pattern.

22. A method of making a panel [as claimed in claim 21] *comprising at least one sheet of light permeable material and a design formed on said sheet, said design being visible from one side of the panel and not visible from the other side of said panel, said design being superimposed on or forming a part of a silhouette pattern and wherein said design is decreasingly perceptible from the side of the panel from which said design is normally visible as the level of illumination through the panel from the other side increases, said method including the steps of:*

*printing a silhouette pattern of discrete print elements on the panel; and*

*printing a design of discrete print elements on the panel, the location of the discrete elements of said design corresponding to the location of at least some of the discrete elements* *of said silhouette pattern;* wherein said step of printing a silhouette pattern and the step of printing a design includes:

adhering a first layer to the panel having cut-out portions in predetermined positions; and adhering a second layer over said first layer, said second layer being removable from the exposed panel portions but not from said first layer.

23. A method of making a panel [as claimed in claim 21] *comprising at least one sheet of light permeable material and a design formed on said sheet, said design being visible from one side of the panel and not visible from the other side of said panel, said design being superimposed on or forming a part of a silhouette pattern and wherein said design is decreasingly perceptible from the side of the panel from which said design is normally visible as the level of illumination through the panel from the other side increases, said method including the steps of:*

*printing a silhouette pattern of discrete print elements on the panel; and*

*printing a design of discrete print elements on the panel, the location of the discrete elements of said design*

*corresponding to the location of at least some of the discrete elements* *of said silhouette pattern;* wherein the steps of printing a silhouette pattern and printing a design comprise:

depositing the silhouette pattern and design by transfer.

24. A method of making a panel [as claimed in claim 21,] *comprising at least one* *sheet of light permeable material and a design formed on said sheet, said design being visible from one side of the panel and not visible from the other side of said panel, said design being superimposed on or forming a part of a silhouette pattern and wherein said design is decreasingly perceptible from the side of the panel from which said design is normally visible as the level of illumination through the panel from the other side increases, said method including the steps of:*

*printing a silhouette pattern of discrete print elements on the panel; and*

*printing a design of discrete print elements on the panel, the location of the discrete elements of said design corresponding to the location of at least some of the discrete elements* *of said silhouette pattern;* wherein said step of printing said silhouette pattern includes applying a stencil to the panel; and coating a marking material on the panel.

25. A method of making a panel [as claimed in claim 21] *comprising at least one* *sheet of light permeable material and a design formed on said sheet, said design being visible from one side of the panel and not visible from the other side of said panel, said design being superimposed on or forming a part of a silhouette pattern and wherein said design is decreasingly perceptible from the side of the panel from which said design is normally visible as the level of illuminating through the panel from the other side increases, said method* *including the steps of:*

*printing a silhouette pattern of discrete print elements on the panel; and*

*printing a design of discrete print elements on the panel, the location of the discrete elements of said design corresponding to the location of at least some of the discrete elements* *of said silhouette pattern;* wherein said steps of printing said silhouette pattern and said design include applying a marking material to the panel; and removing portions of said marking material to leave the desired design and silhouette pattern.

26. A method as claimed in claim 25, wherein part of said marking material is removed by etching.

27. A method as claimed in claim 25, wherein part of said marking material is removed by applying a sheet over the said part of the marking material, said sheet adhering to said marking material; and removing the applied sheet.

28. A method [as claimed in claim 21] *of making a panel comprising at least one* *sheet of light permeable material and a design formed on said sheet, said design being visible from one side of the panel and not visible from the other side of said panel, said design being superimposed on or forming a part of a silhouette pattern and wherein said design is decreasingly perceptible from the side of the panel from which said design is normally visible as the level of illumination through the panel from the other side increases, said method including the steps of:*

*printing a silhouette pattern of discrete print elements on the panel; and*

*printing a design of discrete print elements on the panel, the location of the discrete* *elements of said design corresponding to the location of at least some of the discrete elements* *of said silhouette pattern;* wherein the steps of printing the silhouette pattern and the design include applying a cut sheet to the panel, said design and said silhouette pattern being formed in said cut sheet.

29. *A panel as claimed in claim 1, wherein the design is applied by means of transfer from a carrying membrane.*

30. A panel [[as claimed in claim 1,]] comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

*wherein said* silhouette pattern and said design are both printed on said *sheet of light permeable material* [[is printed with a]], *said design comprising at least one color layer, each said color layer having at least one boundary; and within the perimeter of said panel each said color layer is superimposed on and within said silhouette pattern having at least one boundary such that any boundary of any said color layer is inside and spaced from a boundary of said silhouette pattern.*

31. *A panel comprising:*

*a sheet of light permeable material; and*

*a design formed on said sheet, said design visible from one side of the panel and not visible from the other side of the panel, said design being superimposed on or forming a part of a silhouette pattern; and*

*wherein said silhouette pattern and said design are located between at least two sheets of transparent material laminated together with poly (vinyl butyral) material; and*

*wherein said design is decreasingly perceptible from the side of the panel from which said design is normally visible as the level of illumination through the panel from the other* *side increases.*

32. *A panel as claimed in claim 1, comprising indicia superimposed on said* *silhouette pattern, each indicium having at least one boundary and any boundary of any individual indicium not extending beyond any opaque area of said silhouette pattern on at* *least one of said one side and said other side.*

33. *A panel comprising:*

*at least two sides of light permeable material and wherein at least one of the sheets of light permeable material is a self-adhesive film; and*

*a design formed on a sheet, said design visible from one side of the panel and not visible from the other side of the panel, said design being superimposed on or forming a part* *of a silhouette pattern and wherein said design is decreasingly perceptible from the side of the panel which said design is normally visible as the level of illumination through the panel from the other side increases.*

34. A panel [[as claimed in claim 1,]] comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increase; and wherein a principal perceived image when viewing said panel changes from said design to a space on said other side when the illumination is altered from relative light on the one side and relative dark on the other side to relative light on the other side and relative dark on the one side;

wherein said sheet of light permeable material comprises a perforated material adhered to a transparent material by a perforated self-adhesive layer, and wherein said design is formed on said perforated material.

35. *An assembly as claimed in claim 15, wherein at least one of said perforated protective film and a mask controls areas of application of said design onto said perforated material.*

36. *An assembly as claimed in claim 15, wherein said perforated material comprises at least two layers.*

37. A panel [[as claimed in claim 1,]] comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing panel changes from said design to a space on said other side when the illumination is altered from relative light on the one side and relative dark on the other side to relative light on the other side and relative dark on the one side;

wherein said light permeable material is static cling polyvinylchloride film.

38. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

wherein said silhouette pattern is formed by a cut self-adhesive film, said cut self-adhesive film comprising a cut film layer and a cut adhesive layer disposed in contact with said cut film layer, said design formed on said cut film layer, and wherein said sheet of light permeable material is adhered to said cut self-adhesive film via said cut adhesive layer.

39. A panel as claimed in claim 38, wherein said cut self-adhesive film comprises perforations through said film layer and said adhesive layer.

40. A panel as claimed in claim 38, said panel being made by a process comprising the steps of:

forming an assembly comprising a film layer, a protective film layer and an adhesive layer, wherein said adhesive layer is disposed between said film layer and said protective film layer and adheres said film layer to said protective film layer, cutting said film layer and said adhesive layer while said protective film layer is adhered thereto to form said silhouette pattern, removing said cut film layer and said cut adhesive layer forming said silhouette pattern from said protective film layer, and adhesively attaching said cut film layer and said cut adhesive layer to said sheet of light permeable material to form said panel.

41. A panel as claimed in claim 40, wherein a self-adhesive carrying membrane is attached to said one side of said assembly after said film layer and said adhesive layer are cut and prior to said cut film layer and said cut adhesive layer are applied to said sheet of light permeable material.

42. A panel as claimed in claim 38, wherein said cut self-adhesive film is cut by punching.

43. A panel as claimed in claim 40, wherein said cutting said film layer and said adhesive layer is accomplished by means of a laser.

44. A panel as claimed in claim 40, wherein said protective film is uncut.

45. A panel as claimed in claim 40, wherein said film layer and said adhesive are perforated by laser cutting.

46. A panel as claimed in claim 40, wherein said film layer, said adhesive layer, and said protective film layer are perforated by punching.

47. A panel as claimed in claim 38, wherein said silhouette pattern comprises a pattern of discrete lines.

48. A panel as claimed in claim 1, said panel being made by a process comprising the steps of: forming an assembly comprising a cut printed layer cut to form a part of said design, a film layer, and a carrier layer; removing said film layer from said assembly; applying said cut printed layer and said carrier layer to said sheet of light permeable material; removing said carrier layer to leave said cut printed layer forming said part of said design on said sheet of light permeable material.

49. A panel as claimed in claim 1, further comprising:

a self-adhesive film, said self-adhesive film comprising a film layer and an adhesive layer;

said design formed on a selected one said self-adhesive film and said sheet of light permeable material, wherein said film layer and said adhesive layer of said self-adhesive film are devoid of perforating.

50. A panel as claimed in claim 1, further comprising:

a self-adhesive film comprising a film layer and an adhesive layer each formed from a substantially transparent substance; and said design formed on a selected one of said sheet of light permeable material and said self-adhesive film.

51. A panel as claimed in claim 50, wherein said design is formed on a side of said film layer remote from said adhesive layer and wherein said design is visible through at least one of said sheet of light permeable material and said self-adhesive film.

52. A panel as claimed in claim 50, wherein said design is visible through the substantially transparent substances of said film layer and of said adhesive layer.

53. panel as claimed in claim 1, further comprising:

a self-adhesive film, said self-adhesive film comprising a film layer and an adhesive layer disposed in contact with one side of the film layer; and said design formed on a selected on of said sheet of light permeable material and said self-adhesive film.

54. A panel as claimed in claim 53, wherein said adhesive layer is disposed in contact with said one side of the film layer substantially throughout said one side of the film layer.

55. A panel as claimed in claim 53, wherein said design is disposed in contact with a side of said film layer opposite said one side.

56. A panel as claimed in claim 53, wherein said design is applied to certain portions of said one side of the film layer and not applied to other portions of said one side of the film layer, said adhesive layer being in direct contact with said one side of the film layer at said other portions of said one side of the film layer.

57. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illuminating through the panel from the other side increases, and wherein a principal perceived image when viewing said panel changes from said design to a space on said other side when the illumination is altered from relative light on the one side and relative dark on the other side to relative light on the other side and relative dark on the one side;

wherein said design and said silhouette pattern comprise at least three superimposed layers including a design color layer, a first background color layer, and a second background color layer, and wherein a particular cross-section taken through said panel comprises two outer edges of said light permeable material and alternate opaque and transparent portions of said silhouette pattern, at least one of said opaque portions within said cross-section being constructed and arranged such that a) it includes a part of said design color layer, a part of said first background color layer, and a part of said second background color layer;

b) it includes two outer edges of each of said part of said design color layer, said part of said first background color layer, and said part of said second background color layer; and c) a single side of said part of said design color layer is disposed in contact with both said part of said first background color layer and said part of said second background color layer, and wherein said part of said design color layer extends across at least one of said two outer edges of said part of said first background color layer.

58. A panel as claimed in claim 57, wherein said design color layer has two outer boundaries defined on two of said opaque portions spaced within said cross-section, said design color layer being disposed on at least a part of each of said opaque portions that lie between said two outer boundaries, and wherein in each of said opaque portions between those defining said two outer boundaries of said design color layer, said two outer edges of said first background color layer are contained within said two outer edges of said design color layer.

59. A panel as claimed in claim 1, wherein said design and said silhouette pattern comprise at least three superimposed layers including a design color layer, a first background color layer, and a second background color layer, and wherein a particular cross-section taken through said panel comprises two outer edges of said light permeable material and alternate opaque and transparent portions of said silhouette pattern, at least one of said opaque portions within said cross-section being constructed and arranged such that a) it includes a part of said design color layer, a part of said first background color layer, and a part of said second background color layer;

b) it includes two outer edges of each of said part of said design color layer, said part of said first background color layer, and said part of said second background color layer; and c) one of said parts has one of its two outer edges disposed within and spaced from the two outer edges of another of said parts, and wherein said one of said parts has the other of its two outer edges disposed outside the two outer edges of said another of said parts.

60. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing panel changes from said design to a space on said other side when the illumination is altered from relative light on the one side and relative dark on the other side to relative light on the other side and relative dark on the one side;

wherein said design and said silhouette pattern comprise at least two superimposed layers including a design color layer and a background color layer, and wherein a particular cross-section taken through said panel comprises two outer edges of said light permeable material and alternate opaque and transparent portions of said silhouette pattern, at least one of said opaque portions within said cross-section being constructed and arranged such that a) it includes a part of said design color layer and a part of said background color layer;

b) it includes two outer edges of each of said part of said design color layer and said part of said background color layer; and c) both said two outer edges of said part of said design color layer are within and spaced from said two outer edges of said part of said background color layer.

61. A panel as claimed in claim 60, wherein said at least one of said opaque portions comprises at least a part of another design color layer, and said part of another design color layer has two outer edges, and wherein both said two outer edges of said part of another design color layer are within and spaced from said two outer edges of said part of said background color layer.

62. A panel as claimed in claim 60, wherein said at least one of said opaque portions comprises at least three superimposed layers including a part of another background color layer, and said part of another background color layer has two outer edges, and wherein both said two outer edges of said part of another background color layer are outside and spaced from said two outer edges of said part of said background color layer.

63. A panel as claimed in claim 1, wherein said design and said silhouette pattern comprise at least three superimposed layers including at least one design color layer, a first background color layer, and at least one additional background color layer, and wherein a particular cross-section taken through said panel comprises two outer edges of said light permeable material and alternate opaque and transparent portions of said silhouette pattern, and wherein each of said opaque portions has two outer edges, at least one of said opaque portions within said cross-section being constructed and arranged such that a) it includes a part of said at least one design color layer, a part of said first background color layer, and a part of said at least one additional background color layer, b) it includes two outer edges of each of said part of said at least one design color layer, said part of said first background color layer, and said part of said at least one additional background color layer, and c) both said two outer edges of said part of said at least one design color layer and both said two outer edges of said part of said at least one additional background color layer are within and spaced from said two outer edges of said part of said first background color layer.

64. A panel as claimed in claim 2, wherein said design and said second design are both superimposed ink layers printed onto said one side of said light permeable material.

65. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

wherein said light permeable material comprises a sheet of toughened glass and wherein said design and said silhouette pattern comprise ceramic ink fused into a surface of said sheet of toughened glass.

66. A panel comprising:

a sheet of light permeable material; and a design formed on said sheet, said design visible from one side of the panel and not visible from the other side of panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

wherein said design and said silhouette pattern are formed by applying ceramic ink onto a carrying membrane and applying said ceramic ink and said carrying membrane onto a surface of a sheet of glass and fusing said ceramic ink into said surface of said sheet of glass.

67. A panel as claimed in claim 66, wherein said carrying membrane and said ceramic ink are cut to form perforations in said carrying membrane and said ceramic ink.

68. A panel as claimed in claim 1, wherein said design is applied by a four color process.

69. A panel as claimed in claim 68, and wherein said design has an outer boundary, wherein said design is superimposed on at least a part of each of said opaque portions that lie within said outer boundary, and wherein said design is formed by applying a marking material onto each of said opaque portions that lie within said outer boundary and between each of said opaque portions that lie within said outer boundary, and removing said marking material from between said opaque portions that lie within said outer boundary so that said design is disposed only on said opaque portions that lie within said outer boundary and is not disposed on said transparent portions that lie within said outer boundary of said design.

70. A panel as claimed in claim 1, wherein said design and said silhouette pattern are applied by a five color process.

71. A panel as claimed in claim 1, wherein said silhouette pattern and said design are litho printed.

72. A panel as claimed in claim 1, wherein said design is formed by hot foil transfer.

73. A panel as claimed in claim 1, wherein a particular cross-section taken through said panel comprises alternate opaque and transparent portions of said silhouette pattern, and wherein at least one of said opaque portions and at least one of said transparent portions adjacent to said at least one of said opaque portions are formed by a first material applied within said at least one of said opaque portions that adheres well to said light permeable material and a second material that is applied to said first material within said at least one of said opaque portions and to said light permeable material within said at least one of said transparent portions, and wherein said second material adheres well to said first material and adheres less well to said light permeable material, and wherein said second material is substantially removed from said light permeable material within said at least one of said transparent portions and is not substantially removed from said first material within said at least one of said opaque portions.

74. A panel as claimed in claim 1, wherein said design comprises an array of light sources excited by electrical current.

75. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

wherein said silhouette pattern comprises a plurality of discrete opaque areas each having an outer perimeter, wherein one of said discrete opaque areas comprises two superimposed color layers each having an outer boundary, at least a part of each of said two superimposed color layers being visible from said one side of said panel, wherein a first of said color layers extends over the whole of said one of said opaque areas and said outer boundary of said first of said color layers defines said outer perimeter of said one of said opaque areas, wherein a second of said color layers of a different color than said first of said color layers is superimposed on only a part of said first of said color layers, wherein a part of said outer boundary of said color layers extends across said first of said color layers and another part of said outer boundary of said second of said color areas is coincident with a part of said outer perimeter of said one of said discrete opaque areas.

76. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side relative light on the other side and relative dark on the one side;

wherein said silhouette pattern comprises a plurality of discrete opaque areas each having an outer perimeter, wherein one side of each of said discrete opaque areas is visible from said one side of said panel, wherein said one side of one of said discrete opaque areas has two color areas of different color disposed thereon, wherein each of said two color areas has an outer boundary and said two color areas have a mutual boundary between a first of said color areas and a second of said color areas, wherein one part of said outer boundary of said first of said color areas comprises said mutual boundary which extends across said one opaque area, and wherein another part of said outer boundary of said first of said color areas is coincident with part of said outer perimeter of said one of said discrete opaque areas.

77. A panel as claimed in claim 76, wherein another of said discrete opaque areas is adjacent to and spaced from said one of said opaque areas, and wherein said another of said discrete opaque areas has another mutual boundary between two color areas including one color area being of the same color as said first of said color areas and another color area being of the same color as said second of said color areas, said another mutual boundary extending across said another of said discrete opaque areas, and wherein said mutual boundary on said at least one of said discrete opaque areas is substantially aligned with said another mutual boundary on said another of said discrete opaque areas.

78. A panel as claimed in claim 1, wherein said silhouette pattern comprises a material which is faceted for enhanced reflectivity of light incident on said one side of the panel.

79. A panel as claimed in claim 1, wherein in one part of said panel said silhouette pattern comprises a uniform pattern of opaque elements having a uniform geometric shape, and wherein in another part of said panel said silhouette pattern comprises at least one opaque element having a shape different than said uniform geometric shape.

80. A panel as claimed in claim 1, wherein said design and said silhouette pattern comprise a design layer and a transparent material layer, wherein a particular cross-section taken through said panel comprises alternate opaque and transparent portions of said silhouette pattern, wherein each of said opaque portions has two outer edges, wherein said transparent material layer extends only within said two outer edges of each of said opaque portions, and wherein said design layer is printed directly onto said transparent material layer.

81. A panel as claimed in claim 1, wherein said silhouette pattern comprises a pattern of discrete straight parallel lines.

82. A panel as claimed in claim 1, wherein said silhouette pattern comprises curved lines.

83. A panel as claimed in claim 1, wherein said light permeable material is light gathering, wherein said design is located on said other side of said sheet of light permeable material, and wherein light incident on said other side of said sheet of light permeable material is reflected internally within said sheet of light permeable material until scattered by said design and emitted through said one side of said sheet of light permeable material.

84. A panel as claimed in claim 1, wherein said sheet of light permeable material has one surface on said one side and an opposite surface on said other side, said design being disposed on said opposite surface of said sheet of light permeable material, and said panel being constructed and arranged to internally reflect light introduced through an edge of said sheet of light permeable material until scattered by the design on said opposite surface and emitted through said one surface.

85. A panel as claimed in claim 1, wherein a particular cross-section taken through said panel comprises alternate opaque portions of said silhouette pattern and transparent portions, and wherein at least one of said transparent portions comprises a plurality of different colors.

86. A panel as claimed in claim 1, wherein said panel forms part of spectacles or a visor.

87. A panel as claimed in claim 1, wherein said design extends over only part of said silhouette pattern, wherein said design comprises a relatively light color, wherein a portion of said silhouette pattern surrounding said design comprises a color relatively darker in comparison with said relatively light color of said design, wherein said relatively light color of said design and said relatively darker color of said portion of said silhouette pattern surrounding said design are such that an object disposed on said other side of said panel in spaced relation from the panel that is visible from the one side through said portion of said silhouette pattern surrounding said design is simultaneously substantially obstructed from vision when viewed from the one side through said relatively light color of said design.

88. A panel comprising:

a sheet of light permeable material; and a design formed on said sheet, said design visible from one side of the panel and not visible from the other side of the panel, said design being superimposed on or forming a part of a silhouette pattern and wherein said design is decreasingly perceptible from the side of the panel from which said design is normally visible as the level of illumination through the panel from the other side increases, and wherein a principal perceived image when viewing said panel changes from said design to a space on said other side when the illumination is altered from relative light on the one side and relative dark on the other side to relative light on the other side and relative dark on the one side;

wherein said silhouette pattern comprises discrete opaque areas presenting a plurality of color areas of different color on one side thereof which is visible from said one side of said panel, each of said color areas having an outer boundary, and wherein a mutual boundary comprising a portion of the outer boundaries of two of said color areas of different color extends across a plurality of said discrete opaque areas adjacently disposed to one another.

89. A panel as claimed in claim 88, wherein said adjacently disposed discrete opaque areas each individually define a portion of said mutual boundary between said two color areas, and wherein said mutual boundary on one of said discrete opaque areas is substantially aligned with said mutual boundary on an adjacent one of said discrete opaque areas.

* * * * *